(12) United States Patent
Yamamoto et al.

(10) Patent No.: US 6,595,860 B1
(45) Date of Patent: Jul. 22, 2003

(54) PORTABLE INFORMATION TERMINAL AND RECORDING MEDIUM

(75) Inventors: Tetsuji Yamamoto, Tokyo (JP); Kenji Sawaguchi, Tokyo (JP); Yuji Shinkai, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/414,662

(22) Filed: Oct. 7, 1999

(30) Foreign Application Priority Data

Oct. 8, 1998 (JP) ........................................... 10-287130
Sep. 24, 1999 (JP) ........................................... 11-271164

(51) Int. Cl.[7] ................................................. A63F 11/00
(52) U.S. Cl. ............................ 463/43; 463/44; 463/46; 463/47; 273/148 B; 273/148 R
(58) Field of Search ......................... 273/237; 128/897; 235/380, 382, 462.45; 463/43, 44, 45

(56) References Cited

U.S. PATENT DOCUMENTS

| | | | | |
|---|---|---|---|---|
| RE28,503 E | * | 8/1975 | Townsend et al. ............ 473/70 |
| 4,097,855 A | * | 6/1978 | Salvo ..................... 340/323 R |
| 4,130,871 A | * | 12/1978 | Olsen et al. .................. 700/92 |
| 4,286,323 A | * | 8/1981 | Meday ........................ 700/92 |
| 4,752,068 A | * | 6/1988 | Endo .......................... 463/15 |
| 5,428,528 A | * | 6/1995 | Takenouchi et al. .......... 463/42 |
| 5,740,369 A | * | 4/1998 | Yokozawa et al. .......... 235/382 |
| 5,757,354 A | * | 5/1998 | Kawamura .................. 345/656 |
| 5,867,795 A | * | 2/1999 | Novis et al. ................. 455/566 |
| 5,895,906 A | * | 4/1999 | Danielson et al. ...... 235/462.45 |
| 5,913,310 A | * | 6/1999 | Brown ........................ 128/897 |
| 6,022,274 A | * | 2/2000 | Takeda et al. ................. 463/44 |
| 6,037,954 A | * | 3/2000 | McMahon ................... 345/169 |
| 6,317,650 B1 | * | 11/2001 | Powell et al. ............... 235/380 |
| 6,392,613 B1 | * | 5/2002 | Goto ........................... 345/30 |

FOREIGN PATENT DOCUMENTS

| | | |
|---|---|---|
| EP | 0 723 233 | 7/1996 |
| EP | 0 779 588 | 6/1997 |
| GB | 2 288 044 | 10/1995 |
| JP | 407299236 A | * 11/1995 |

OTHER PUBLICATIONS

"User's Guide for HP Jornada 600 Series Handheld PC" published by Hewlett Packard Corporation on May 1998.

* cited by examiner

*Primary Examiner*—Valencia Martin-Wallace
*Assistant Examiner*—Yveste Cherubin
(74) *Attorney, Agent, or Firm*—Frommer Lawrence & Haug LLP; William S. Frommer; Hans R. Mahr

(57) ABSTRACT

A portable information terminal can effectively utilize game results and is arranged to be multifunctional. When result information is transmitted from a terminal to another terminal, the destination terminal adds the transmitted result information to result information which has already been held thereby. The items of result information are sorted in the order of scores, and score data are updated. Of the updated result information, the result information having the same identification number as the identification number of the terminal is displayed on a display unit of the terminal.

28 Claims, 19 Drawing Sheets

F I G. 6
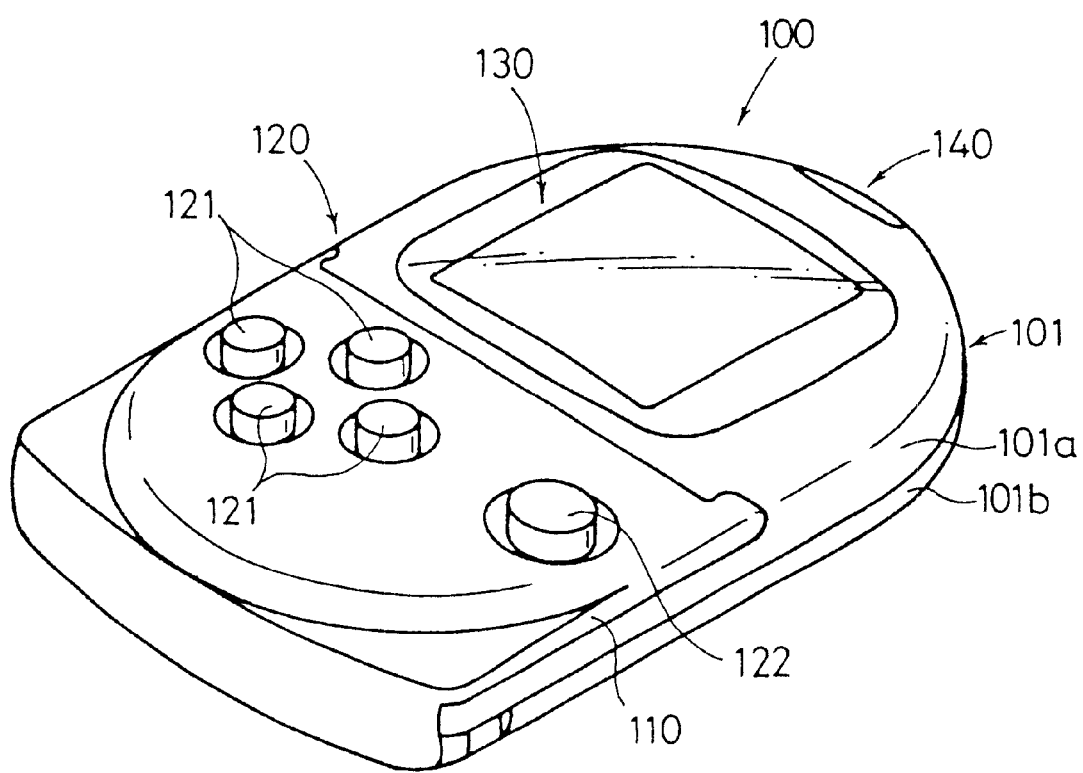

F I G. 7
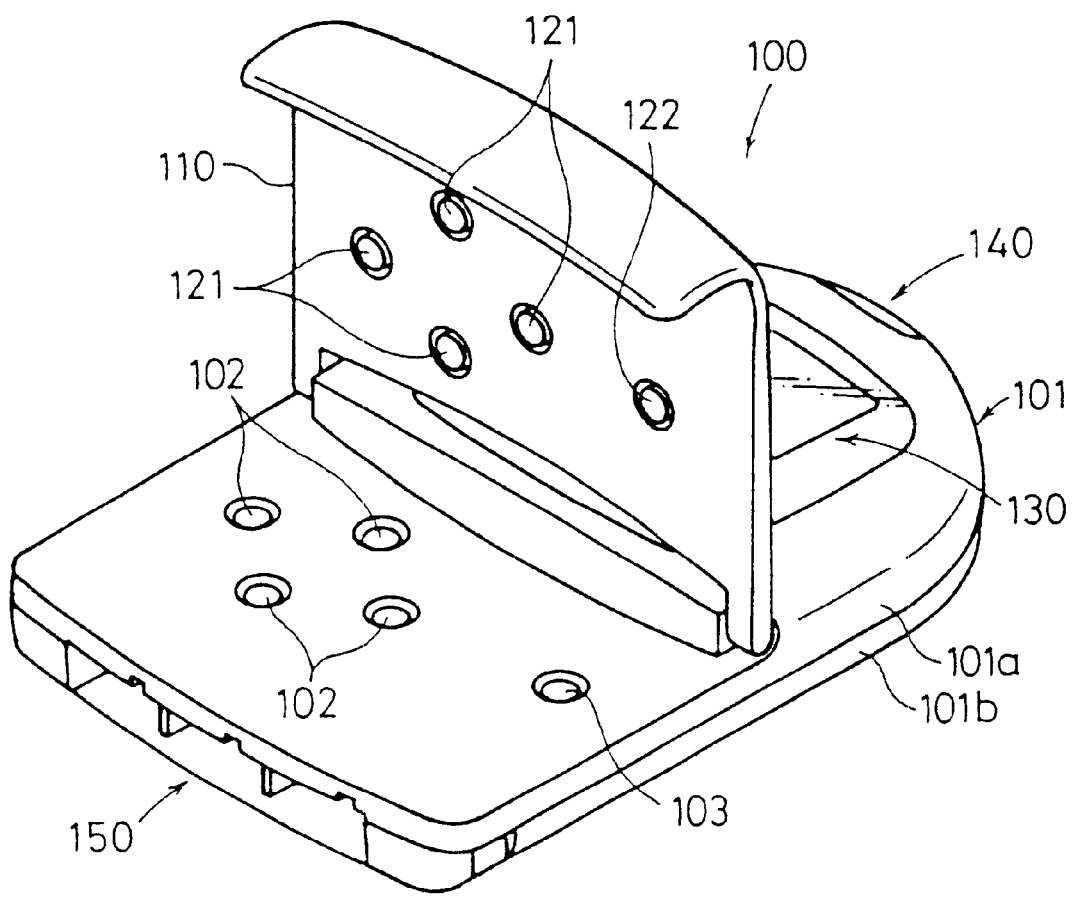

PORTABLE INFORMATION TERMINAL AND RECORDING MEDIUM

BACKGROUND OF THE INVENTION

1. Field of the Invention

The present invention relates to a portable information terminal for use as an auxiliary memory for an information-handling apparatus, and a recording medium which stores a program to be downloaded into the portable information terminal.

2. Description of the Related Art

Most of game software which has heretofore been available in the market generates a score, a time, a number, etc. as a result of the game having been played. In a shooting game, for example, a greater score is earned when more enemy characters are eliminated. In a role-playing game, the period of time consumed after the game has started until it ends is given as a kind of score. In an action game comprising a plurality of stages (minimum units to be cleared), the number of stages that have been cleared before the game is over is given as a kind of score.

Heretofore, when a game is played, the result of the game is simply indicated to the game player, and cannot effectively be utilized by the game player.

SUMMARY OF THE INVENTION

It is therefore an object of the present invention to provide a portable information terminal which is used by an individual and can share information of another portable information terminal used by another individual in addition to its own information, so that the portable information terminal can compare the information of the individual and the information of the other individual with each other, e.g., can effectively utilize game results of the individuals, and the portable information terminal is multifunctional.

Another object of the present invention is to provide a recording medium which stores a program for operating a portable information terminal which is multifunctional.

According to an aspect of the present invention, there is provided a portable information terminal comprising a terminal unit having memory means for storing a program and data, manual control means for entering manual control inputs, control means for executing the program and generating at least images based on manual control inputs entered by the manual control means to proceed with the program, display means for displaying the images generated by the control means, transmitting means for transmitting information relative to the program, receiving means for receiving information relative to the program, the control means comprising information processing means for adding information supplied from another portable information terminal via the receiving means to information already held thereby and sorting all the information according to values thereof.

Since it is possible to share information of a portable information terminal which is used by an individual and also information of another portable information terminal used by another individual, the portable information terminal can compare the information of the individual and the information of the other individual with each other, so that the portable information terminal is multifunctional. All the information is sorted according to the values thereof. Therefore, if the information is related to ranks of a match (including a game), then the ranks can easily be confirmed, and hence information can quickly be transmitted and recognized with ease.

If the portable information terminal is used as a game machine, the game results of a plurality of game players can easily be referred to on the terminal of a certain game player, and hence the skill levels of the game players with respect to the game can easily be confirmed.

In the above portable information terminal, the terminal unit may have inherent identification information, the information may comprise result information processed and generated by an information processing apparatus as a master unit for the terminal unit and transmitted to the terminal unit, and the information may be assigned an identification number of the terminal unit after being transmitted thereto.

This allows the terminal of an individual to easily compare the information held by the individual and the information held by other individuals with each other.

Alternatively, the terminal unit may have inherent identification information, the control means may comprise means for keeping at least one representative item of information of all the information having the same identification number when all the information is sorted.

With this arrangement, it is possible to keep the best result information or the result information having a high utility value, and share it with other individuals.

The program may be downloaded from an information processing apparatus as a master unit for the terminal unit. The information may represent a score, a time, or a number generated as a result of the execution of the program.

According to another aspect of the present invention, there is provided a recording medium readable by a computer and storing a program and data downloaded from a master unit to a portable information terminal comprising a terminal unit having memory means for storing a program and data, manual control means for entering manual control inputs, control means for executing the program and generating at least images based on manual control inputs entered by the manual control means to proceed with the program, display means for displaying the images generated by the control means, transmitting means for transmitting information relative to the program, and receiving means for receiving information relative to the program, the program and data being executable by the terminal unit, the program having the step of processing information by adding information supplied from another portable information terminal via the receiving means to information already held thereby and sorting all the information according to values thereof.

With the above recording medium, since it is possible to share information of a portable information terminal which is used by an individual and also information of another portable information terminal used by another individual, the portable information terminal can compare the information of the individual and the information of the other individual with each other, so that the portable information terminal is multifunctional. All the information is sorted according to the values thereof. Therefore, if the information is related to ranks of a match (including a game), then the ranks can easily be confirmed, and hence information can quickly be transmitted and recognized with ease.

In the recording medium, the terminal unit may have inherent identification information, the information may comprise result information processed and generated by an information processing apparatus as the master unit and transmitted to the terminal unit, and the information may be assigned an identification number of the terminal unit after being transmitted thereto.

In the recording medium, alternatively, the terminal unit may have inherent identification information, the program comprising step of keeping at least one representative item of information of all the information having the same identification number when all the information is sorted.

In the recording medium, the information may represent a score, a time, or a number generated as a result of the execution of the program.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a perspective view of the portable information terminal;

FIG. 7 is a perspective view of the portable information terminal with a lid being open;

DESCRIPTION OF THE PREFERRED EMBODIMENT

An embodiment of a portable information terminal according to the present invention will be described below with reference to FIGS. 1 through 19.

Figure 1:
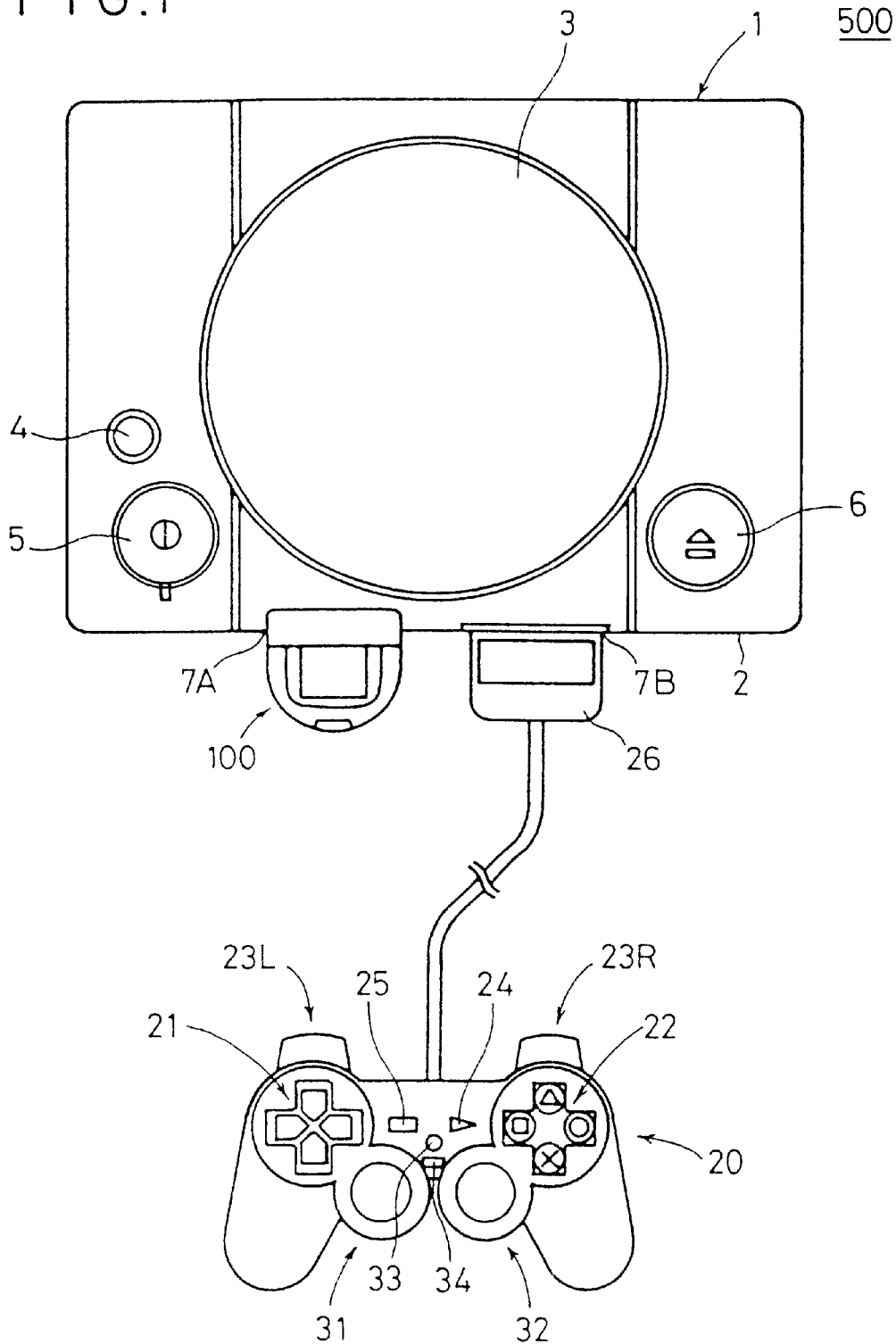
FIG. 1 is a plan view of an entertainment system to which a method of adding information according to the present invention is applied.

As shown in FIG. 1, an entertainment system, generally denoted by 500, to which a method of adding information according to the present invention is applied has an entertainment apparatus 1 to which a terminal 100 is detachably connected.

The entertainment apparatus 1 reads a program recorded in an optical disk or the like, for example, and executes a game, for example, based on the program depending on commands from the user, e.g., the game player. The execution of the game mainly represents controlling the progress of the game and the display of images and the generation of sounds.

The entertainment apparatus 1 has a rectangular casing 2 which houses a disk loading unit 3 substantially centrally therein for loading an optical disk such as a CD-ROM or the like as a recording medium for supplying an application program recorded therein. The casing 2 supports a reset switch 4 for resetting a program which is being presently executed, a power supply switch 5, a disk control switch 6 for controlling the loading of the optical disk, and two slots 7A. 7B.

The entertainment apparatus 1 may be supplied with the application program via a communication link, rather than being supplied from the optical disk as the recording medium.

The entertainment system 500 also includes a manual controller 20 for supplying user's commands to the entertainment apparatus 1.

Two manual controllers 20 may be connected respectively to the slots 7A, 7B allow two users or game players to play a competition game, for example. A memory card which has conventionally been used or a terminal according to the embodiment of the present invention may also be inserted into the slots 7A, 7B. While the two slots 7A, 7B are shown in FIG. 1, the entertainment apparatus 1 may have more or less than two slots.

The manual controller 20 has first and second control pads 21, 22, a left button 23L, a right button 23R, a start button 24, a selector button 25, analog control pads 31, 32, a mode selector switch 33 for selecting control modes for the analog control pads 31, 32, and an indicator 34 for indicating a selected control mode. The manual controller 20 also has a vibration imparting mechanism (not shown) disposed therein for imparting vibrations to the manual controller depending on how the video game proceeds. The manual controller 20 is electrically connected to the slot 7B in the casing 2 by a connector 26.

Figure 2:
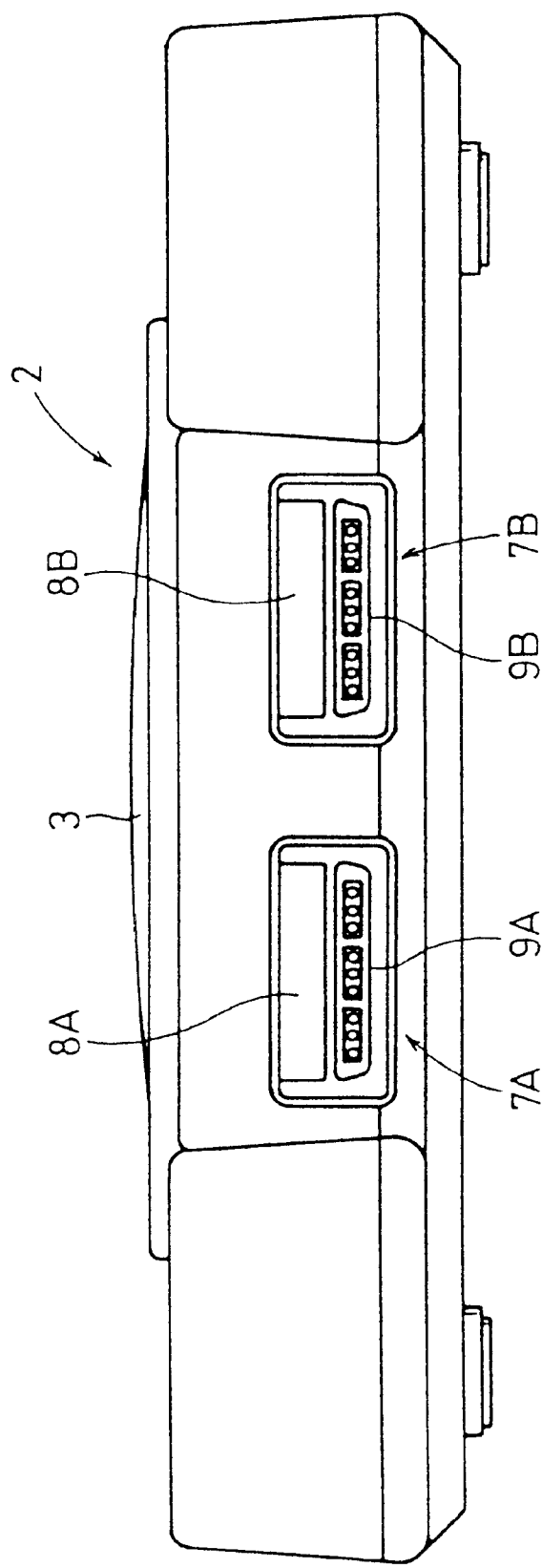
FIG. 2 is a front view of an entertainment apparatus, showing slots thereof.

FIG. 2 shows the slots 7A, 7B which are defined in a front panel of the casing 2 of the entertainment apparatus.

Each of the slots 7A, 7B has upper and lower units. Specifically, the slots 7A, 7B have respective memory card insertion units 8A, 8B as their upper units for inserting a memory card or the terminal 100 therein and respective controller connectors (jacks) 9A, 9B as their lower units for connection to a connection terminal (connector) 26 of the manual controller 20.

The memory card insertion units 8A, 8B have respective insertion holes (slots) that are of a horizontally elongate rectangular shape. These insertion slots have lower opposite corners round in contrast to upper opposite corners thereof so that the memory card will not be inserted into the memory card insertion units 8A, 8B in the wrong orientation. The memory card insertion units 8A, 8B also have shutters for protecting connection terminals disposed therein for electric connection.

The controller connectors 9A, 9B also have respective insertion holes (slots) that are of a horizontally elongate rectangular shape. These insertion slots have lower opposite corners round in contrast to upper opposite corners thereof so that the connector terminal 26 of the manual controller will not be connected to the controller connectors 9A, 9B in the wrong orientation. The insertion holes of the controller connectors 9A, 9B are different in shape from the insertion holes of the memory card insertion units 8A, 8B so that the memory card will not be inserted into the insertion holes of the controller connectors 9A, 9B.

Figure 3:
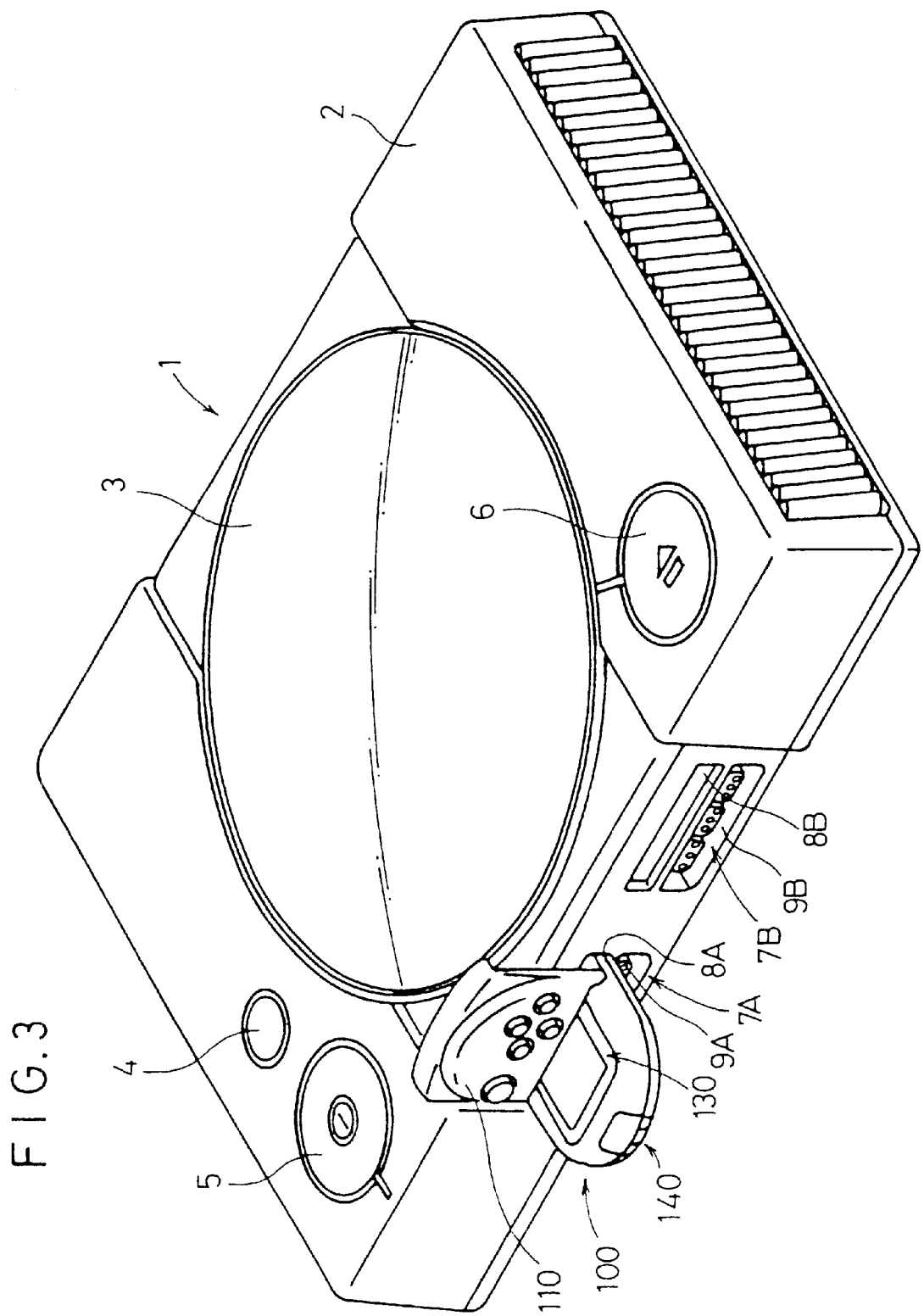
FIG. 3 is a perspective view of the entertainment apparatus.

In FIG. 3, the terminal 100 is inserted in the memory card insertion unit 8A in the slot 7A which is defined in the front panel of the entertainment apparatus 1.

Figure 4:
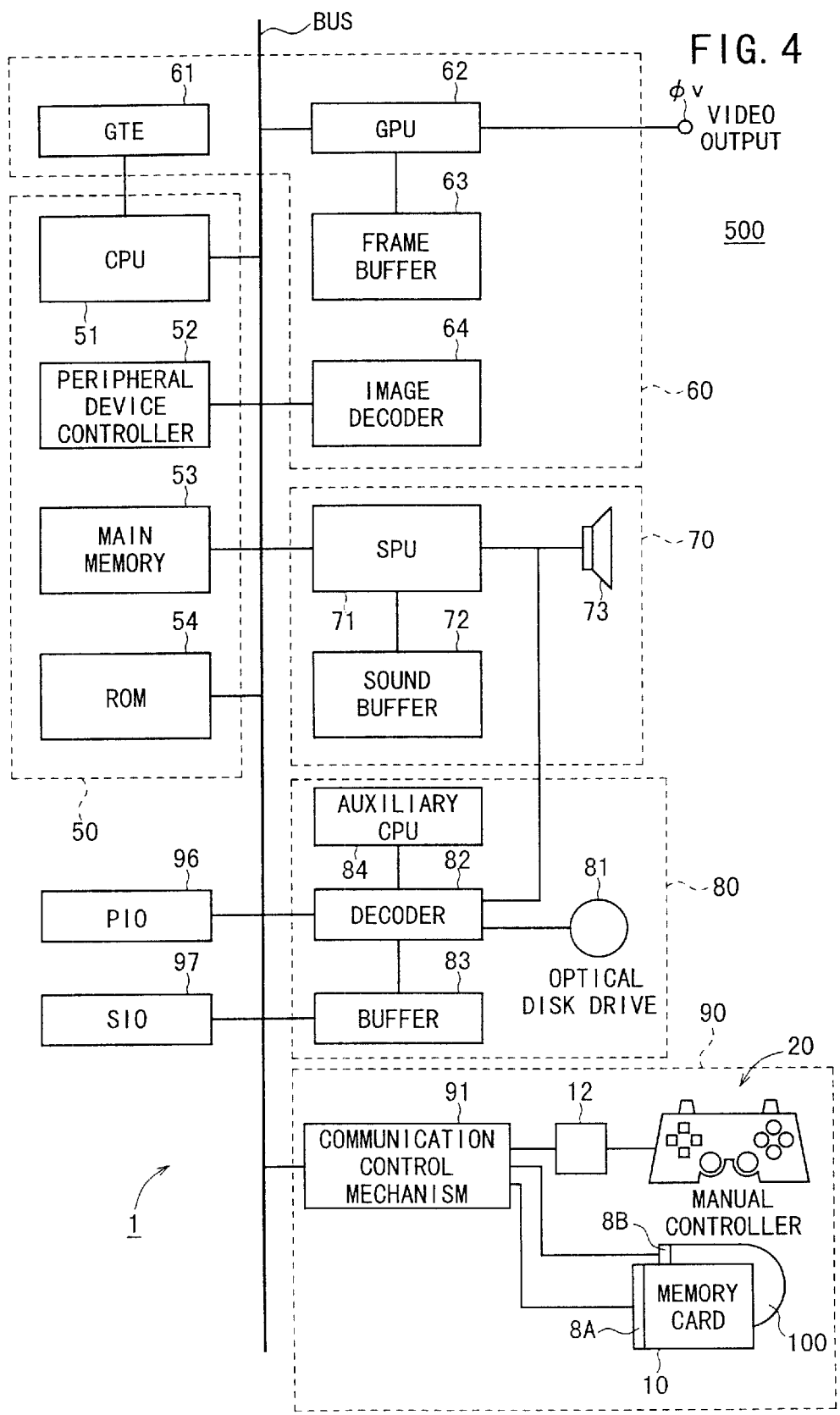
FIG. 4 is a block diagram of a specific arrangement of major components of the entertainment apparatus.
Figure 5:
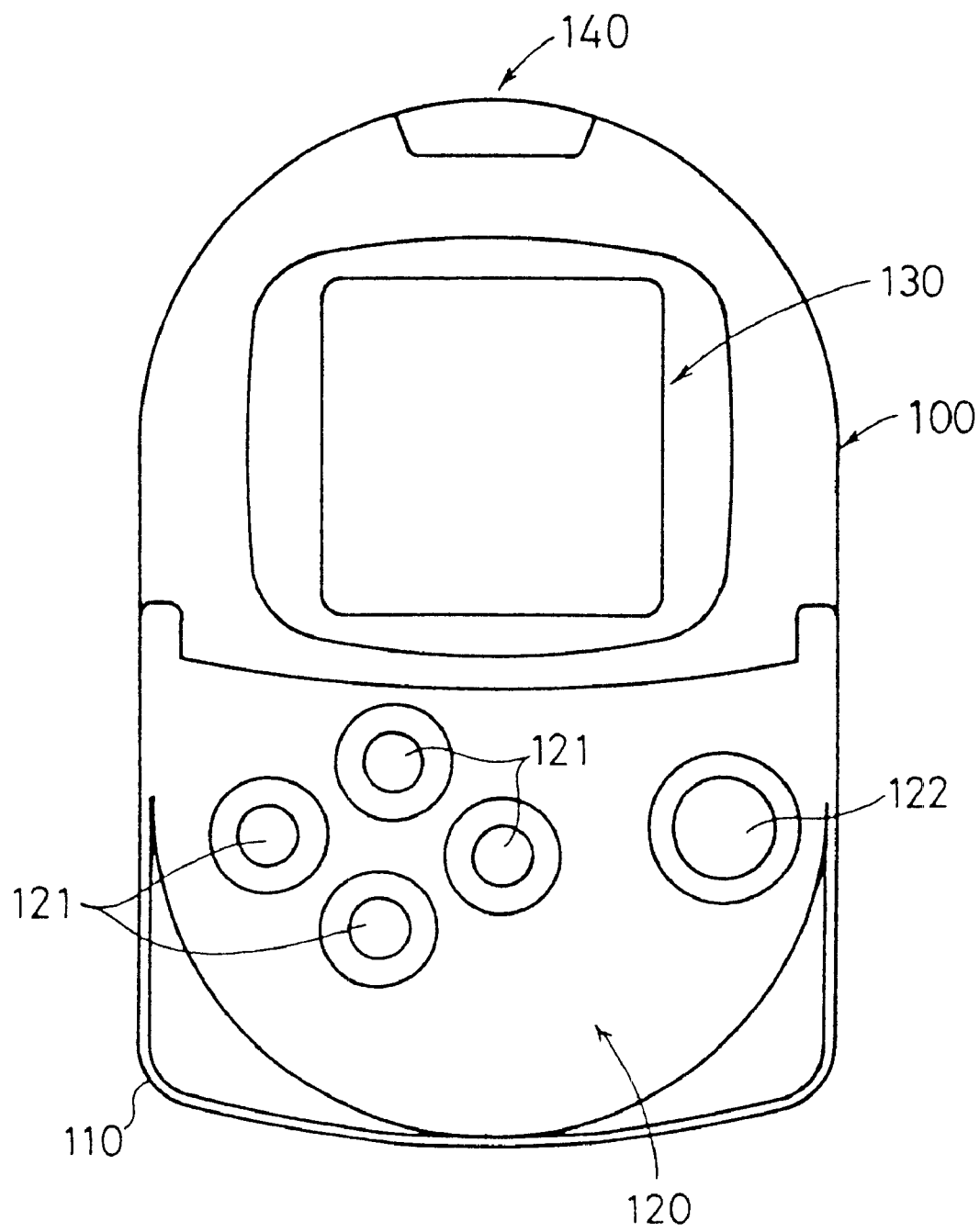
FIG. 5 is a plan view of a portable information terminal.

A specific arrangement of the entertainment apparatus 1 will be described below with reference to FIG. 4. As shown in FIG. 4, the entertainment apparatus 1 comprises a control system 50 including a central processing unit (CPU) 51 and its peripheral devices, a graphic system 60 including a graphic processing unit (GPU) 62 for generating and storing image data in a frame buffer 63, a sound system 70 including a sound processing unit (SPU) 71 for generating music sounds and sound effects, an optical disk controller 80 for controlling an optical disk in which application programs are recorded, a communication controller 90 for controlling signals from the manual controller 20 which enter instructions from the user, and data supplied to and from a memory card 10 which stores game settings, and a BUS to which the control system 50, the graphic system 60, the sound system 70, the optical disk controller 80, and the communication controller 90 are connected.

The control system 50 comprises a CPU 51, a peripheral device controller 52 for controlling interrupts and direct memory access (DMA) data transfer, a main memory 53 comprising a random-access memory (RAM), and a read-only memory (ROM) 54 which stores various programs such as an operating system for managing the main memory 53, the graphic system 60, the sound system 70, etc. The main memory 53 is a memory capable of storing a program which is being executed.

The CPU 51 controls the entertainment apparatus 1 in its entirety by executing the operating system stored in the ROM 54. The CPU 51 comprises a 32-bit RISC-CPU, for example.

When the entertainment apparatus 1 is turned on, the CPU 51 executes the operating system stored in the ROM 54 to start controlling the graphic system 60, the sound system 70, etc. For example, when the operating system is executed, the CPU 51 initializes the entertainment apparatus 1 in its entirety for checking its operation, and thereafter controls the optical disc controller 80 to execute an application program recorded in the optical disk.

As the application program is executed, the CPU 51 controls the graphic system 60, the sound system 70, etc. depending on commands entered from the user for thereby controlling the display of images and the generation of music sounds and sound effects.

The graphic system 60 comprises a geometry transfer engine (GTE) 61 for performing coordinate transformations and other processing, a GPU 62 for generating image data according to instructions from the CPU 51, a frame buffer 63 for storing image data generated by the GPU 62, and an image decoder 64 for decoding image data compressed and encoded by an orthogonal transform such as a discrete cosine transform.

The GTE 61 has a parallel arithmetic mechanism for performing a plurality of arithmetic operations parallel to each other, and can perform coordinate transformations, light source calculations, matrixes, or vectors at a high speed in response to a request from the CPU 51. Specifically, the GTE 61 can calculate the coordinates of a maximum of 1.5 million polygons per second for a flat shading process to plot one triangular polygon with one color, for example. With the GTE 61, the entertainment apparatus 1 is able to reduce the burden on the CPU 51 and perform high-speed coordinate calculations.

According to an image generating instruction from the CPU 51, the GPU 62 generates and stores the data of a polygon or the like in the frame buffer 63. The GPU 62 is capable of generating and storing a maximum of 360 thousand polygons per second.

The frame buffer 63 comprises a dual-port RAM, and is capable of simultaneously storing image data generated by the GPU 62 or image data transferred from the main memory 53, and reading image data for display.

The frame buffer 63 has a storage capacity of 1 Mbytes, for example, and is handled as a 16-bit matrix made up of a horizontal row of 1024 pixels and a vertical column of 512 pixels. The frame buffer 63 has a display area for storing image data to be outputted as video output data, a CLUT (color look-up table) area for storing a color look-up table which will be referred to by the GPU 62 when it generates a polygon or the like, and a texture area for storing texture data to be subjected to coordinate transformations when a polygon is generated by the GPU 62 and to be mapped onto the generated polygon. The CLUT area and the texture area are dynamically varied as the display area is varied.

The GPU 62 can perform, in addition to the flat shading process, a Gouraud shading process for determining colors in polygons by interpolating intensities from the vertices of the polygons, and a texture mapping process for mapping textures stored in the texture areas onto polygons. For performing the Gouraud shading process or texture mapping process, the GTE 61 can perform coordinate calculations for a maximum of about 500,000 polygons per second.

The image decoder 64 is controlled by the CPU 51 to decode image data of a still or moving image stored in the main memory 53, and store the decoded image into the main memory 53.

Image data reproduced by the image decoder 64 is transferred to the frame buffer 63 by the GPU 62, and can be used as a background for an image plotted by the GPU 62.

The sound system 70 comprises an SPU 71 for generating music sounds, sound effects, etc. based on instructions from the CPU 51, a sound buffer 72 for storing waveform data from the SPU 71, and a speaker 73 for outputting music sounds, sound effects, etc. generated by the SPU 71.

The SPU 71 has an ADPCM (adaptive differential PCM) function for reproducing 16-bit sound data which has been encoded as 4-bit differential sound data by ADPCM, a reproducing function for reproducing the waveform data stored in the sound buffer 72 to generate sound effects, etc., and a modulating function for modulating and reproducing the waveform data stored in the sound buffer 72.

The sound system 70 can be used as a sampling sound source which generates music sounds, sound effects, etc. based on the waveform data stored in the sound buffer 72 according to commands from the CPU 51.

The optical disk controller 80 comprises an optical disk drive 81 for reproducing application programs and data recorded on an optical disk such as a CD-ROM or the like, a decoder 82 for decoding programs and data that are recorded with an error correcting code added thereto, and a buffer 83 for temporarily storing data read from the optical disk drive 81 so as to allow the data from the optical disk to be read at a high speed. An auxiliary CPU 84 is connected to the decoder 82.

Sound data recorded on the optical disk which is read by the optical disk drive 81 includes PCM data converted from analog sound signals, in addition to the ADPCM data. The ADPCM data, which is recorded as 4-bit differential data of 16-bit digital data, is decoded by the decoder 82, supplied to the SPU 71, converted thereby into analog data, and applied to drive the speaker 73. The PCM data, which is recorded as 16-bit digital data, is decoded by the decoder 82 and then applied to drive the speaker 73.

The communication controller 90 comprises a communication control mechanism 91 for controlling communication with the CPU 51 via the BUS. The communication control mechanism 91 has the controller connectors 9A, 9B to which the manual controller 20 for entering commands from the user is connected, and the memory card insertion units 8A, 8B for receiving a memory card 10 as an auxiliary memory device for storing game settings, etc. and the terminal 100.

The manual controller 20 connected to one of the controller connectors 9A, 9B has 16 command keys, for example, for entering commands from the user, and transmits statuses of the command keys about 60 times per second to the communication control mechanism 91 by way of synchronous communication according to an instruction from the communication control mechanism 91. The communication control mechanism 91 transmits the statuses of the command keys to the CPU 51.

In this manner, commands from the user are applied to the CPU 51, which carries out a process according to the commands based on the game program being executed.

A large amount of image data needs to be transferred at high speed between the main memory 53, the GPU 62, the image decoder 64, and the decoder 82 for reading a program, displaying an image, or generating and storing image data.

In the entertainment apparatus 1, data are transferred directly between the main memory 53, the GPU 62, the image decoder 64, and the decoder 82 according to the DMA data transfer under the control of the peripheral device controller 52, rather than the CPU 51. Therefore, the burden on the CPU 51 can be reduced for data transfer, and high-speed data transfer can be achieved between the main memory 53, the GPU 62, the image decoder 64, and the decoder 82.

When setting data of a game being executed need to be stored, the CPU 51 transmits the setting data to the communication control mechanism 91, which writes the transmitted setting data into the memory card 10 or the terminal 100 which is inserted in the memory card insertion unit 8A or 8B.

The communication control mechanism 91 has a built-in protection circuit for protection against electric break-down. The memory card 10 and the terminal 100 are separate from the BUS, and can be connected and disconnected while the entertainment apparatus 1 is being energized. Therefore, when the memory card 10 and the terminal 100 suffer a storage capacity shortage, a new memory card or terminal can be connected without having to turning off the entertainment apparatus 1. Consequently, any game data that need to be backed up can be stored in a new memory card connected to the entertainment apparatus 1, without the danger of being lost.

As shown in FIG. 4, the entertainment apparatus 1 further includes a parallel I/O interface (PIO) 96 and a serial I/O interface (SIO) 97 which serve to connect the memory card 10 and the terminal to the entertainment apparatus 1.

The terminal 100 according to the embodiment of the present invention will be described below. It is assumed that the terminal 100 will be used as a slave unit connected to the entertainment apparatus 1 which serves as a master unit.

The terminal 100 is inserted into one of the memory card insertion units 8A, 8B in the slots 7A, 7B of the entertainment apparatus 1, and can be used as a memory card inherent in the connected manual controller 20. For example, if two users or game players play a game on the entertainment apparatus 1, then two terminals 100 are connected to store game results of the respective users.

In order to electrically connect power supply terminals and ground terminals earlier than the other terminals when the memory card 10 and the terminal 100 are inserted into the memory card insertion units 8A, 8B, those power supply terminals and ground terminals of connectors of the memory card 10 and the terminal 100 are made longer than the other terminals for the purpose of achieving safety and stability of electric operation. Corresponding connector conductors of the memory card insertion units 8A, 8B may be made longer than the other connector conductors, or both power supply terminals and ground terminals of connectors of the memory card 10 and the terminal 100 and the connector conductors of the memory card insertion units 8A, 8B may be made longer than the other terminals and connector conductors. Furthermore, the connectors of the memory card 10 and the terminal 100 may be asymmetrically shaped in their longitudinal direction for preventing themselves from being inserted in the wrong direction.

As shown in FIGS. 5 through 8, the terminal 10 has a housing 101 which supports a manual control pad 120 having one or more direction buttons 121 and a decision button 122 for entering events and making various selections, a display unit 130 such as a liquid crystal display (LCD) unit or the like, and a window 140 for wireless communication such as infrared communication with a wireless communication command unit.

The housing 101 comprises an upper shell 101a and a lower shell 101b, and houses a board 151 which supports memory devices, etc. thereon. The housing 101 is shaped so as to be insertable into either one of the slots 7A, 7B in the casing 2 of the entertainment apparatus 1. The housing 101 has a connector 150 on the side of one end thereof which includes a rectangular window.

The window 140 is mounted on a substantially semicircular end of the housing 101 remote from the connector 150. The display unit 130 occupies a substantially half area of the upper shell 101a of the housing 101, and is positioned near the window 140.

The manual control pad 120 occupies the other substantially half area of the upper shell 101a, and is positioned remotely from the window 140. The manual control pad 120 comprises a substantially square lid 110 that is angularly movably supported on the housing 101 and supports thereon the direction buttons 121 and the decision button 122, and switch pressers 102, 103 positioned in an area of the housing 101 which can be opened and closed by the lid 110.

The direction buttons 121 and the decision button 122 extend through the lid 110 from its upper surface to its lower surface. The direction buttons 121 and the decision button 122 are supported on the lid 110 for movement into and out of the upper surface of the lid 110.

The switch pressers 102, 103 have respective pressing elements supported on the housing 101 for movement into and out of the upper surface of the housing 101. When one of the pressing elements is pressed from above, it presses a corresponding a pressure switch such as a diaphragm switch, for example, mounted on the board 151 in the housing 101.

With the lid 110 closed, the switch pressers 102, 103 are held in vertical alignment with the direction buttons 121 and the decision button 122, respectively. Therefore, while the lid 110 is being closed over the housing 101, when the direction buttons 121 and the decision button 122 are pressed from above into the upper surface of the lid 110, the direction buttons 121 and the decision button 122 cause the pressing elements of the corresponding switch pressers 102, 103 to press corresponding pressure switches in the housing 101.

Figure 8:
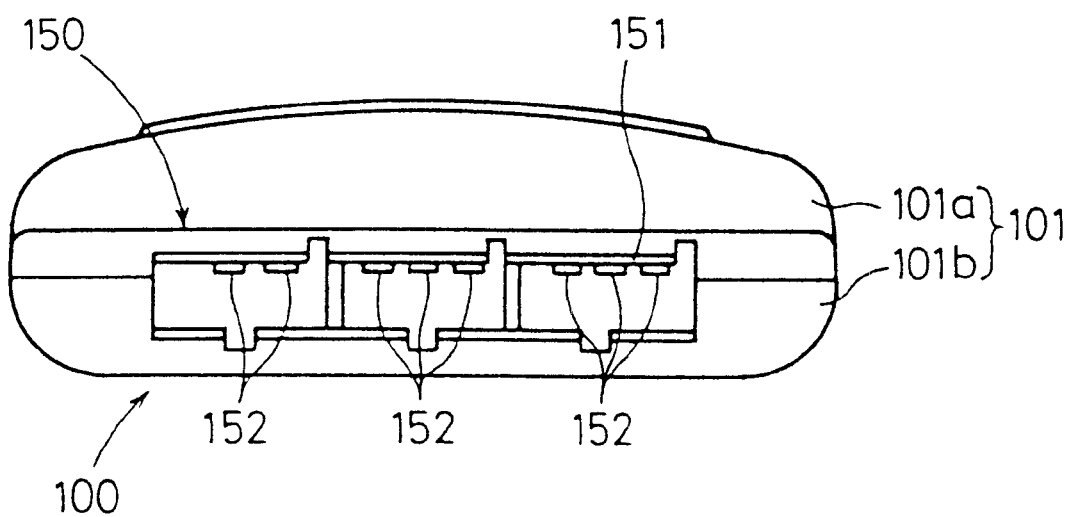
FIG. 8 is a front elevational view of the portable information terminal.

As shown in FIG. 8, power and signal terminals 152 are mounted on the board 151 and disposed in the window of the connector 150.

The connector 150 has a shape and dimensions that are identical to those of the memory card 10 used in the entertainment apparatus 1.

An arrangement of major components of the terminal 100 will be described below with reference to FIGS. 9 and 10.

Figure 9:
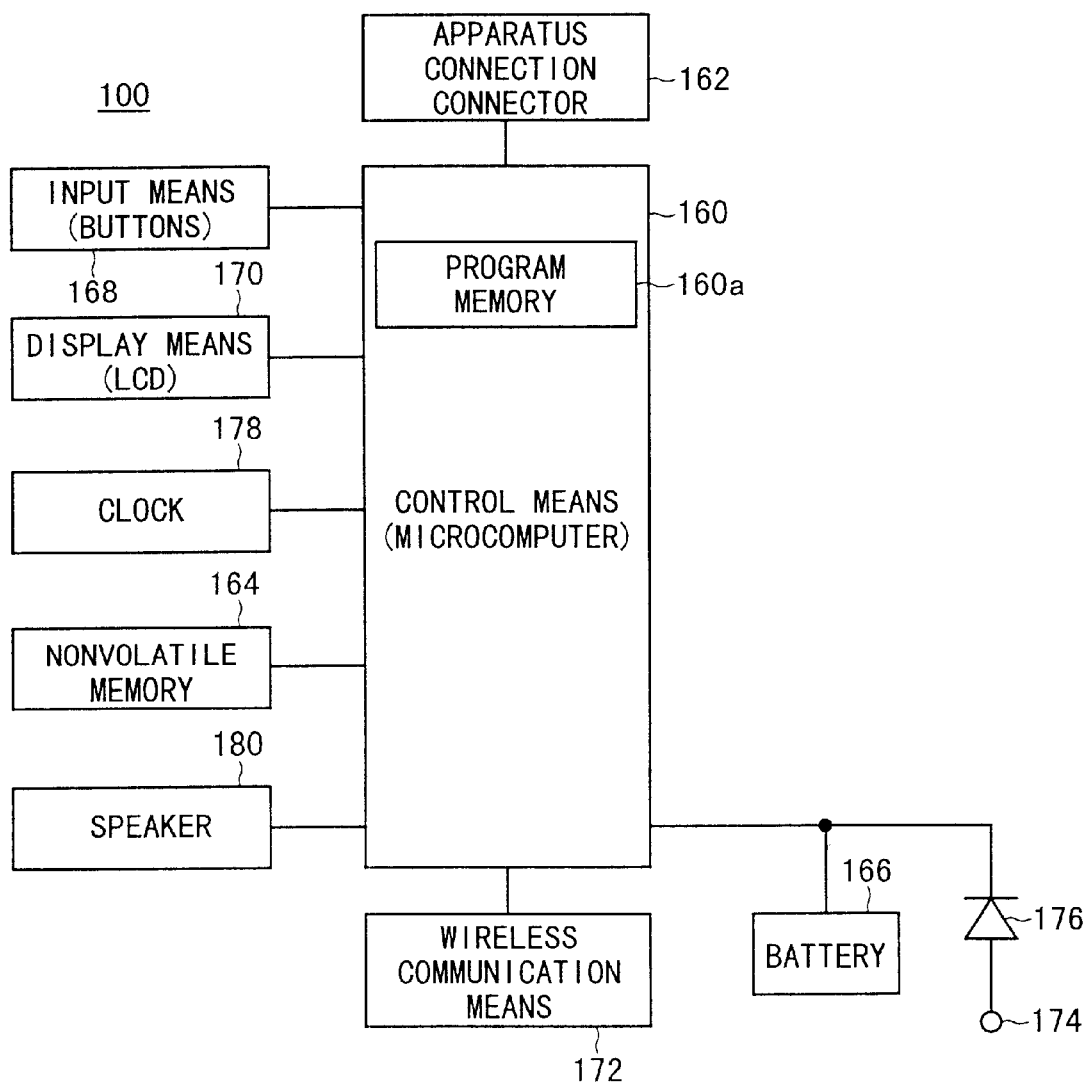
FIG. 9 is a block diagram of an arrangement of major components of the portable information terminal.

As shown in FIG. 9, the terminal 100 comprises a control means 160 for controlling operation of the terminal 100, an apparatus connection connector 162 for connection to a slot of an information-handling apparatus, and a nonvolatile memory 164 for storing data, as with the normal memory card 10 described above.

The control means 160 comprises a microcomputer, for example. The control means 160 has a program memory 160a disposed therein as a program storage means.

The nonvolatile memory 164 comprises a semiconductor memory such as a flash memory which is capable of retaining stored data even when the terminal 100 is turned off. The terminal 100 has a battery 166 as described later on, it can use a static random-access memory (SRAM) for inputting and outputting data at high speed, rather than the nonvolatile memory 164.

The terminal 100 additionally has an event input means 168 such as control buttons for controlling a stored program, a display means 170 such as a liquid crystal display (LCD) unit or the like for displaying various items of information depending on the program, a wireless communication means 172 for sending data to and receiving data from another memory card or the like through an infrared radiation or the like, and a battery 166 for supplying electric energy to various components of the terminal 100.

The battery 166, which serves as a small-size power supply means, allows the terminal 100 to operate independently even when it is removed from the slots 7A, 7B of the entertainment apparatus 1.

The battery 166 may comprise a chargeable secondary battery. When the terminal 100 is inserted in one of the slots 7A, 7B of the entertainment apparatus 1, the terminal 100 is supplied with electric energy from the entertainment apparatus 1.

The battery 166 has a connection terminal which is connected to a power supply terminal 174 via a reverse-current prevention diode 176. When the terminal 100 is inserted in one of the slots 7A, 7B of the entertainment apparatus 1, electric energy is supplied from the entertainment apparatus 1 to the terminal 100, and if the secondary battery is used as the battery 166, the secondary battery is charged by part of the supplied electric energy.

The terminal 100 also has a clock 178 and a speaker 180 such as a piezoelectric buzzer, for example, as a sound generating means for generating sounds according to the program. The above components of the terminal 100 are connected to the control means 160, and operate under the control of the control means 160.

Figure 10:
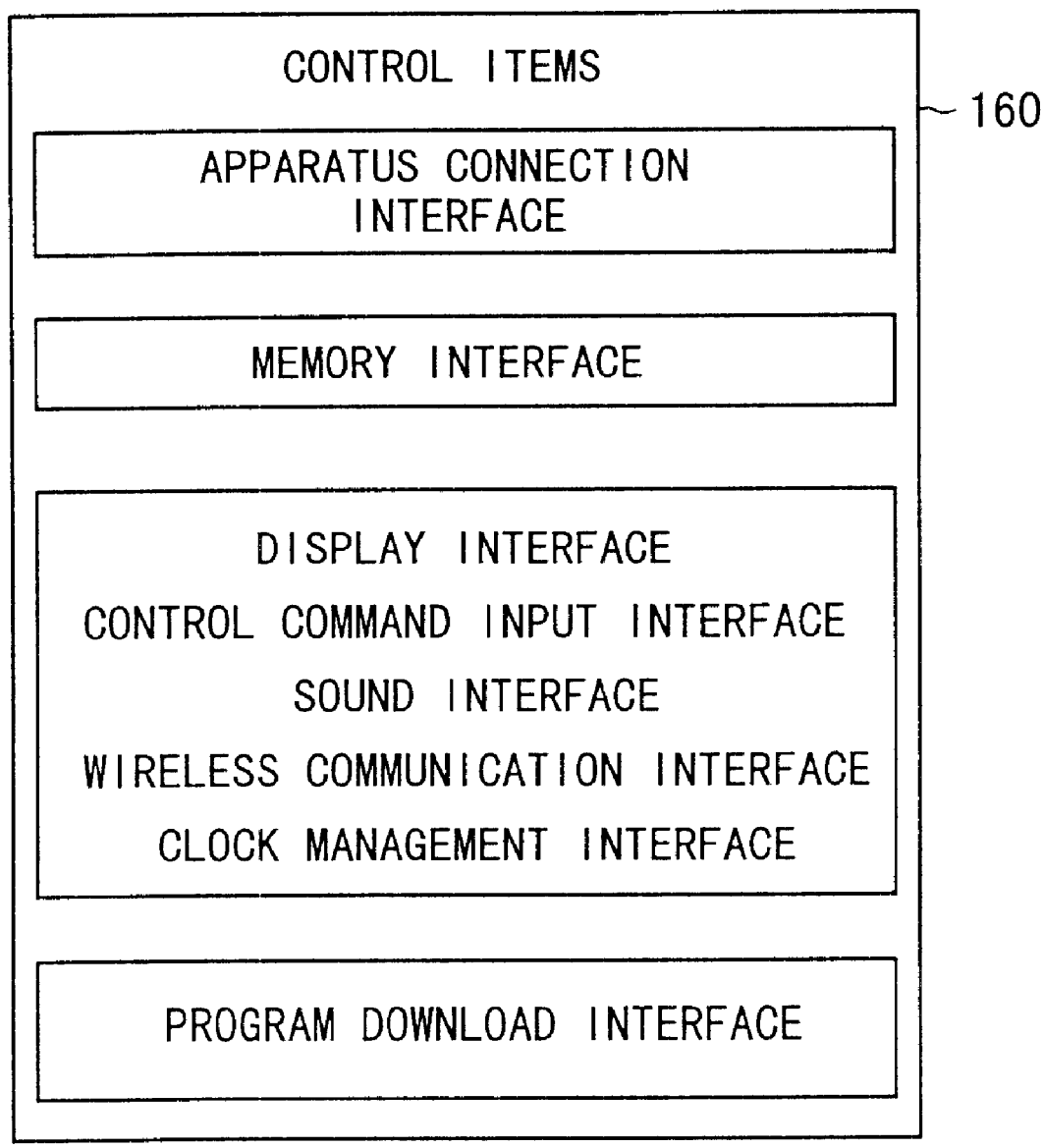
FIG. 10 is a diagram showing control items that are carried out by a control means of the portable information terminal.

FIG. 10 shows control items that are carried out by the control means 160. Whereas the ordinary memory card 10 has only an apparatus connection interface for connection to the information-handling apparatus and a memory interface for entering data into and retrieving data from the memory, the terminal 100 has, in addition to those interfaces, a display interface, a control command input interface, a sound interface, a wireless communication interface, a clock management interface, and a program download interface.

Since the control means 160 of the terminal 100 has interfaces (drivers) for managing functions added according to the embodiment of the present invention, independently of the management for the apparatus connection interface and the memory interface, which are conventional functions, the terminal 100 is compatible with the conventional functions.

The terminal 100 can be used as a portable game device when a game application is executed, because it has the event input means 168 such as control buttons for controlling a program being executed, and the display means 170 in the form of a liquid crystal display (LCD) unit or the like.

The terminal 100 has a function to store a program downloaded from the entertainment apparatus 1 into the program memory 160a of the microcomputer 160. Therefore, an application program and various driver software that operate in the terminal 100 can easily be changed.

As described above, the terminal 100 can be controlled in operation independently of the entertainment apparatus 1. Therefore, the terminal 100 can generate data according to an application stored in the program memory 160a as the program storage means, independently of the application software in the entertainment apparatus 1. If the data thus generated is exchanged between the terminal 100 and the entertainment apparatus 1, then the terminal 100 and the entertainment apparatus 1 is capable of cooperative operation, i.e., can be linked to each other.

The clock 178 allows the terminal 100 to share time data with the entertainment apparatus 1. Specifically, not only the terminal 100 and the entertainment apparatus 1 can have time data equalized to each other, but they can share data for controlling the progress of games which they execute independently of each other, according to real time.

A specific example of cooperative operation between the terminal 100 and the entertainment apparatus 1 will be described later on.

Figure 11:
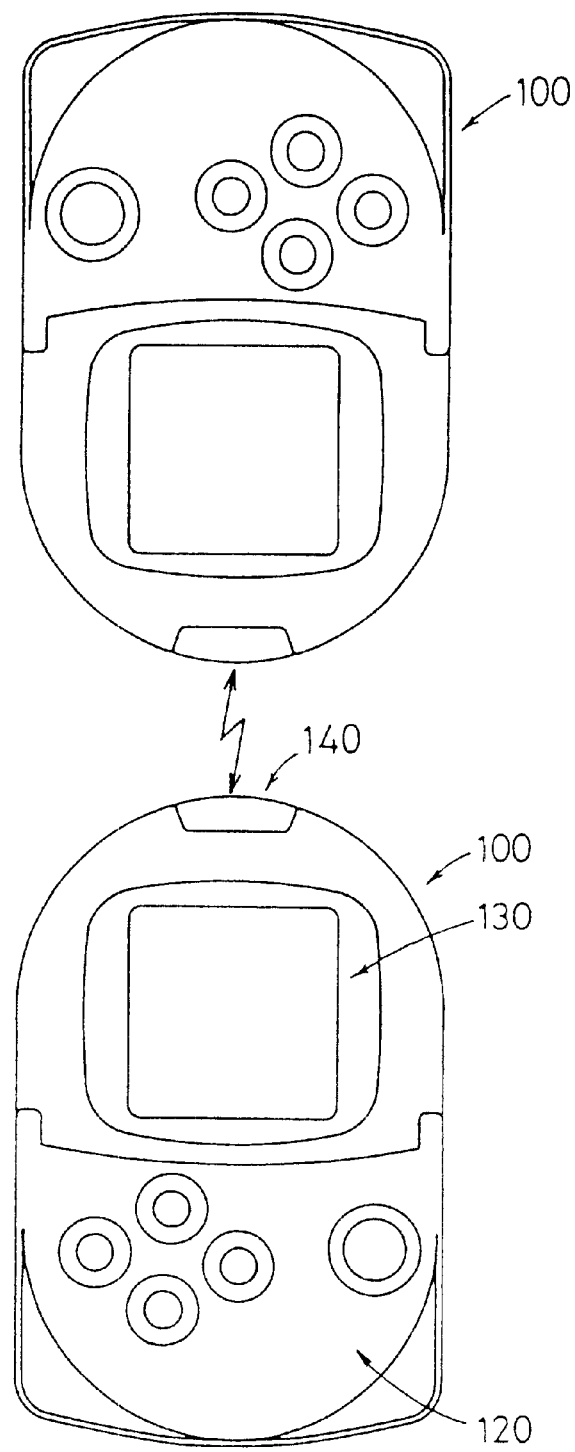
FIG. 11 is a view illustrative of a wireless communication function performed by the portable information terminal.

FIG. 11 schematically illustrates the manner in which wireless communications are carried out between two terminals 100. The wireless communication means 172 of the terminals 100 can send data to and receive data from each other via the windows 140 which serve as wireless communication windows for effecting wireless communications with infrared rays or the like. Therefore, a plurality of memory cards are allowed to exchange internal data with each other. The internal data include data transferred from the information-handling apparatus such as the entertainment apparatus 1 and stored in the memories in the memory cards.

The terminal 100 has been described as an auxiliary storage unit for the entertainment apparatus 1. However, the terminal 100 can be used in various applications. For example, the terminal 100 is applicable to the retrieval of various items of information.

A specific example of cooperative operation between the terminal 100 and the entertainment apparatus 1 will be described below.

As described above, the terminal 100 can share game data generated by the control means or microcomputer 160, time data produced by the clock 178 in the memory card, and data generated by another memory card and transmitted via the wireless communication means 172, with the entertainment apparatus 1.

Figure 12:
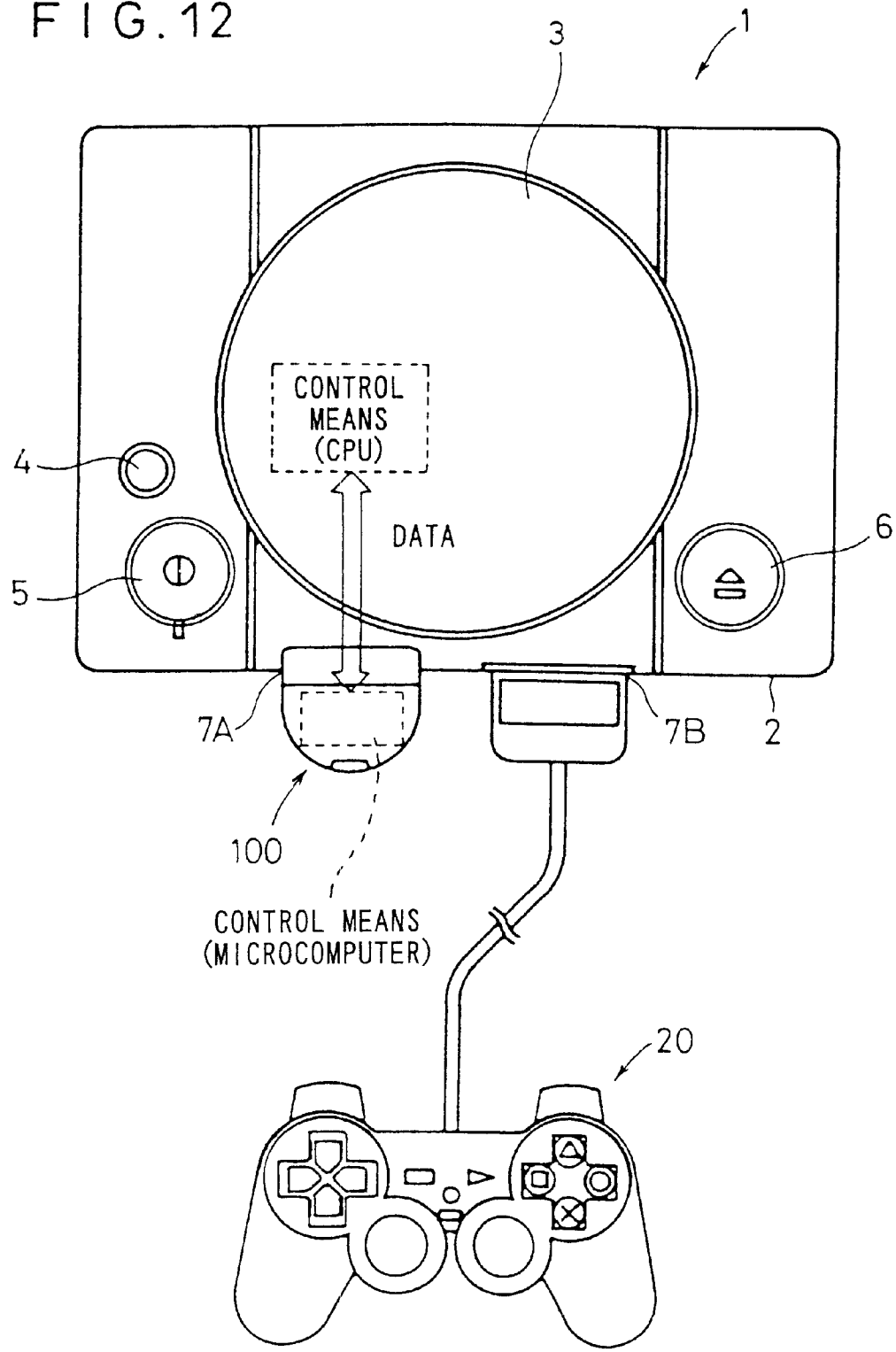
FIG. 12 is a view illustrative of cooperative operation of the entertainment apparatus (master unit) and the portable information terminal (slave unit)

FIG. 12 is illustrative of cooperative operation of the entertainment apparatus 1 as the master unit and the terminal 100 as the slave unit.

In the specific example of cooperative operation, an optical disk (CD-ROM) as a recording medium with an application software program recorded therein is loaded in the entertainment apparatus 1, and the program read from the optical disk is downloaded to the terminal 100 inserted in the slot 7A of the entertainment apparatus 1.

Prior to describing the specific example of cooperative operation, a process of downloading the program as a basis for such cooperative operation will first be described below with reference to FIGS. 13 and 14.

Figure 13:
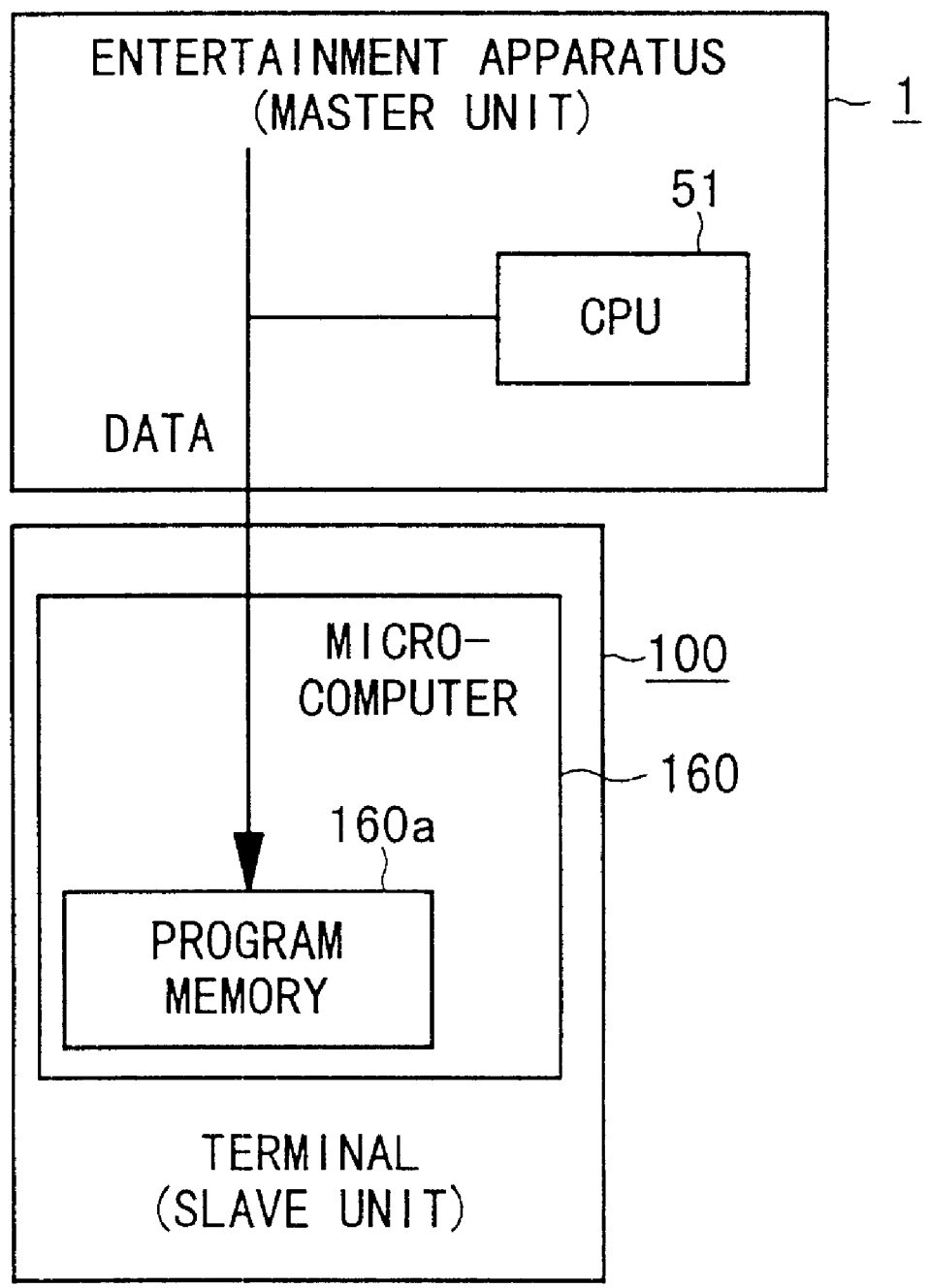
FIG. 13 is a block diagram showing a flow of program data downloaded from the entertainment apparatus (master unit) to the portable information terminal (slave unit)
Figure 14:
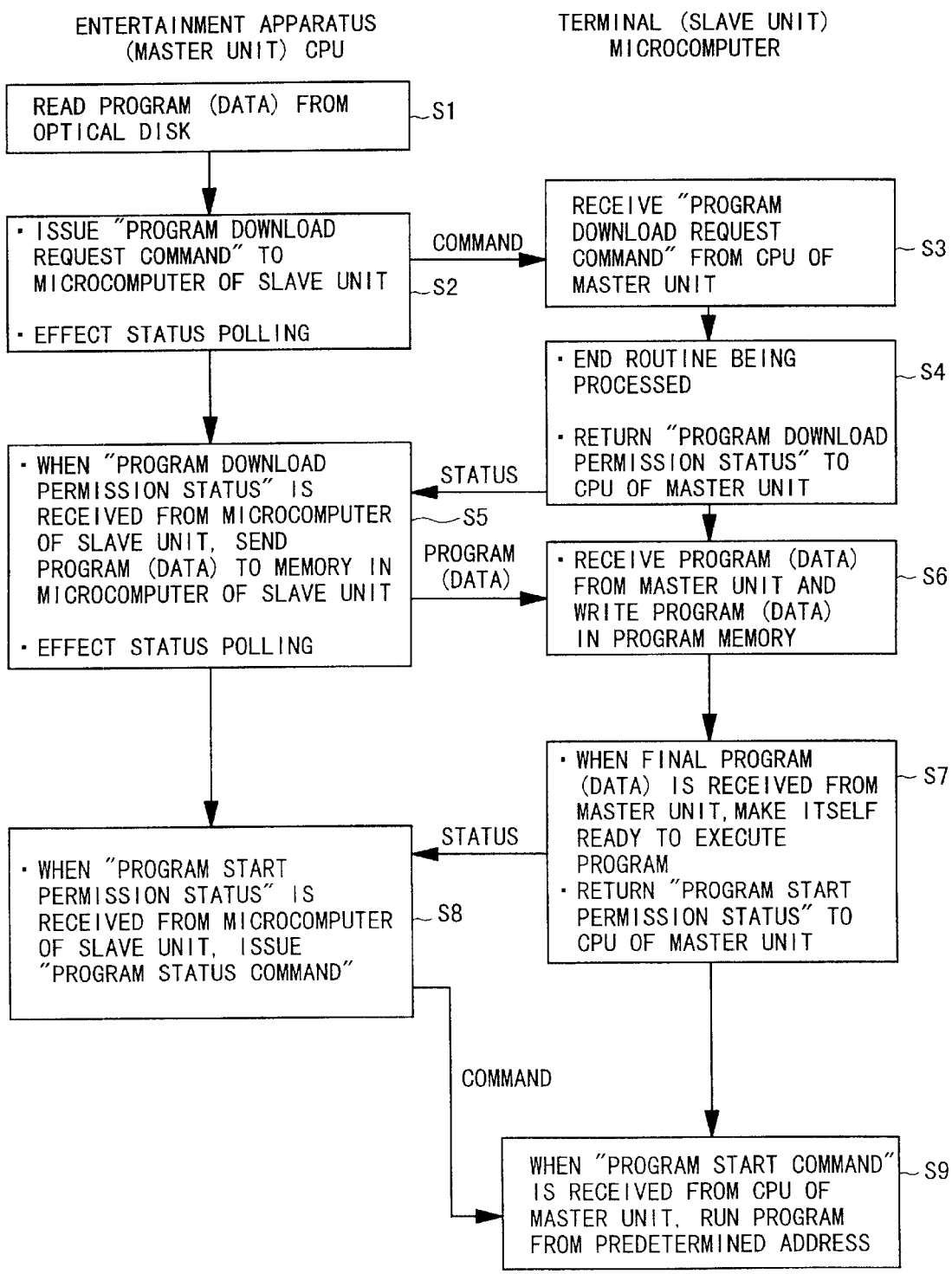
FIG. 14 is a flowchart of a sequence of downloading the program data shown in FIG. 13.

FIG. 13 shows a flow of program data which occurs when an application program such as of a video game supplied from the optical disk (CD-ROM) loaded in the disk loading unit 3 of the entertainment apparatus 1 is directly transferred (downloaded) via the CPU 51 of the entertainment apparatus 1 to the program memory 160a in the microcomputer 160 of the terminal 100. FIG. 14 shows a sequence of downloading the program data shown in FIG. 13.

In step S1 shown in FIG. 14, an application program of a video game which is to be run by the microcomputer 160 in the terminal 100 (hereinafter also referred to as "slave unit") is read as data from the CD-ROM loaded in the disk loading unit 3 of the entertainment apparatus 1 (hereinafter also referred to as "master unit"). Generally, the application program thus read is different from an application program that is run by the entertainment apparatus 1.

In step S2, the CPU 51 issues a "program download request command" to the microcomputer 160. The CPU 51 performs polling in order to receive a "program download permission status" from the microcomputer 160. The polling refers to a process of interrogation to determine whether there is a service request or not.

In step S3, the microcomputer 160 receives the "program download request command" from the CPU 51.

In step S4, when the microcomputer 160 finishes a routine which is being presently executed and is able to execute program downloading, the microcomputer 160 returns the "program download permission status" to the CPU 51.

In step S5, when the CPU 51 receives the "program download permission status" from the microcomputer 160, the CPU 51 transfers (downloads) the program read from the CD-ROM in step S1 to the program memory 160a of the terminal 100 and stores the program in the program memory 160a. The CPU 51 performs polling to receive a "program start permission status" from the microcomputer 160.

The addresses of the program memory 160a where the downloaded data are stored are managed by the microcomputer 160. While the program downloaded from the master unit has been described as being stored in the program memory 160a, the program may be stored in a memory such as a SRAM or the like capable of inputting and outputting data at high speed.

In step S6, the microcomputer 160 receives the program transferred from the master unit as data, and stores the received program in the program memory 160a. At this time, the CPU 51 sees the program data as being directly stored in the program memory 160a of the terminal 100. As described above, the addresses of the program memory 160a are managed by the microcomputer 160.

In step S7, when the microcomputer 160 receives final program data from the master unit and is ready to execute the program, the microcomputer 160 returns the "program start permission status" to the CPU 51.

In step S8, the CPU 51 receives the "program start permission status" from the microcomputer 160, and issues a "program start command".

In step S9, when the microcomputer 160 receives the "program start command" from the CPU 51, the microcomputer 160 starts to run the program from a predetermined address.

According to the above processing sequence, the application program is directly transferred (downloaded) from the entertainment apparatus 1 to the program memory 160a in the microcomputer 160 of the terminal 100 that is inserted in the entertainment apparatus 1.

As described above, the means for supplying the application program is not limited to the recording medium such as an optical disk or the like, but the application program may be supplied via a communication link. If the application program is supplied via a communication link, then only the processing in step S1 shown in FIG. 14 is changed.

The above downloading process downloads the application program directly from the entertainment apparatus 1 to the program memory 160a in the microcomputer 160 of the terminal 100 that is inserted in the entertainment apparatus 1.

However, the CPU 51 may first download data of an application program to the nonvolatile memory 164 in the terminal 100, and thereafter the application program data may be copied to the program memory 160a in the microcomputer 160, after which the application program may be executed.

Figure 15:
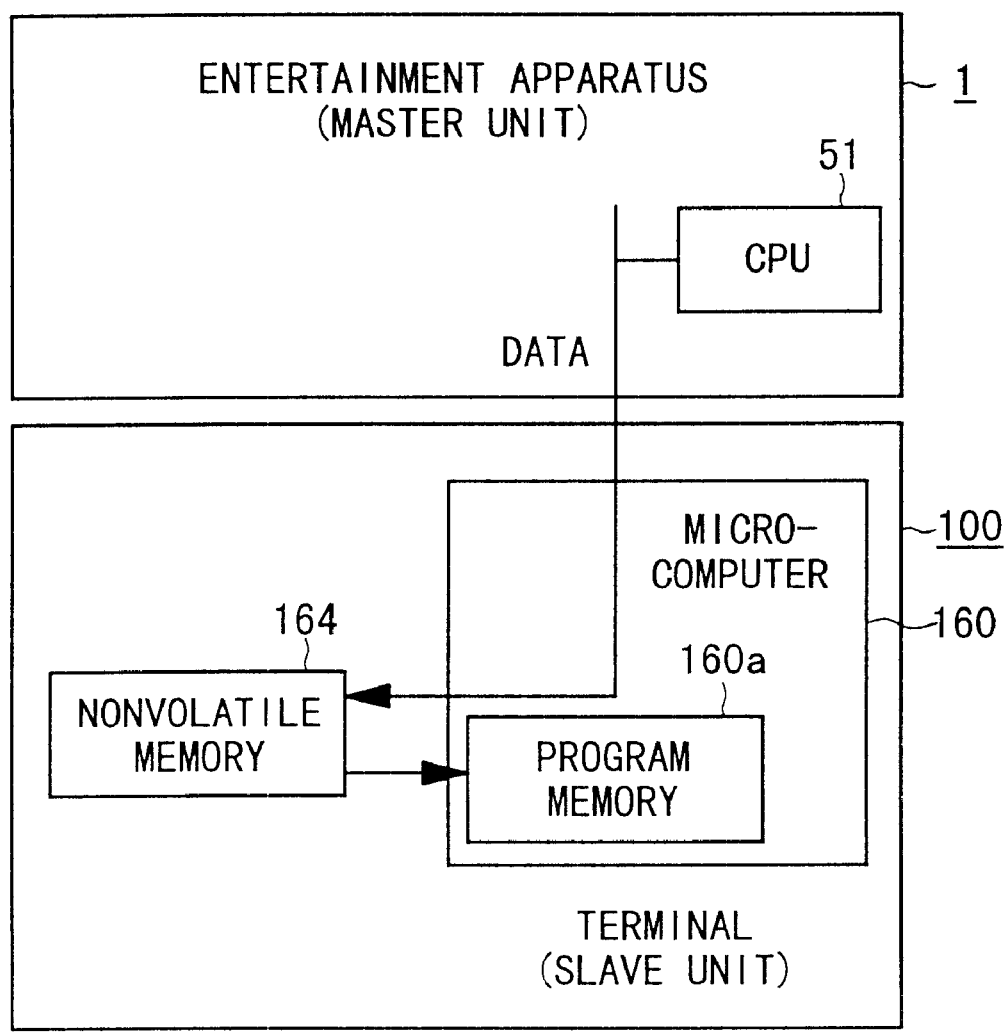
FIG. 15 is a block diagram showing another flow of program data downloaded from the entertainment apparatus (master unit) to the portable information terminal (slave unit)
Figure 16:
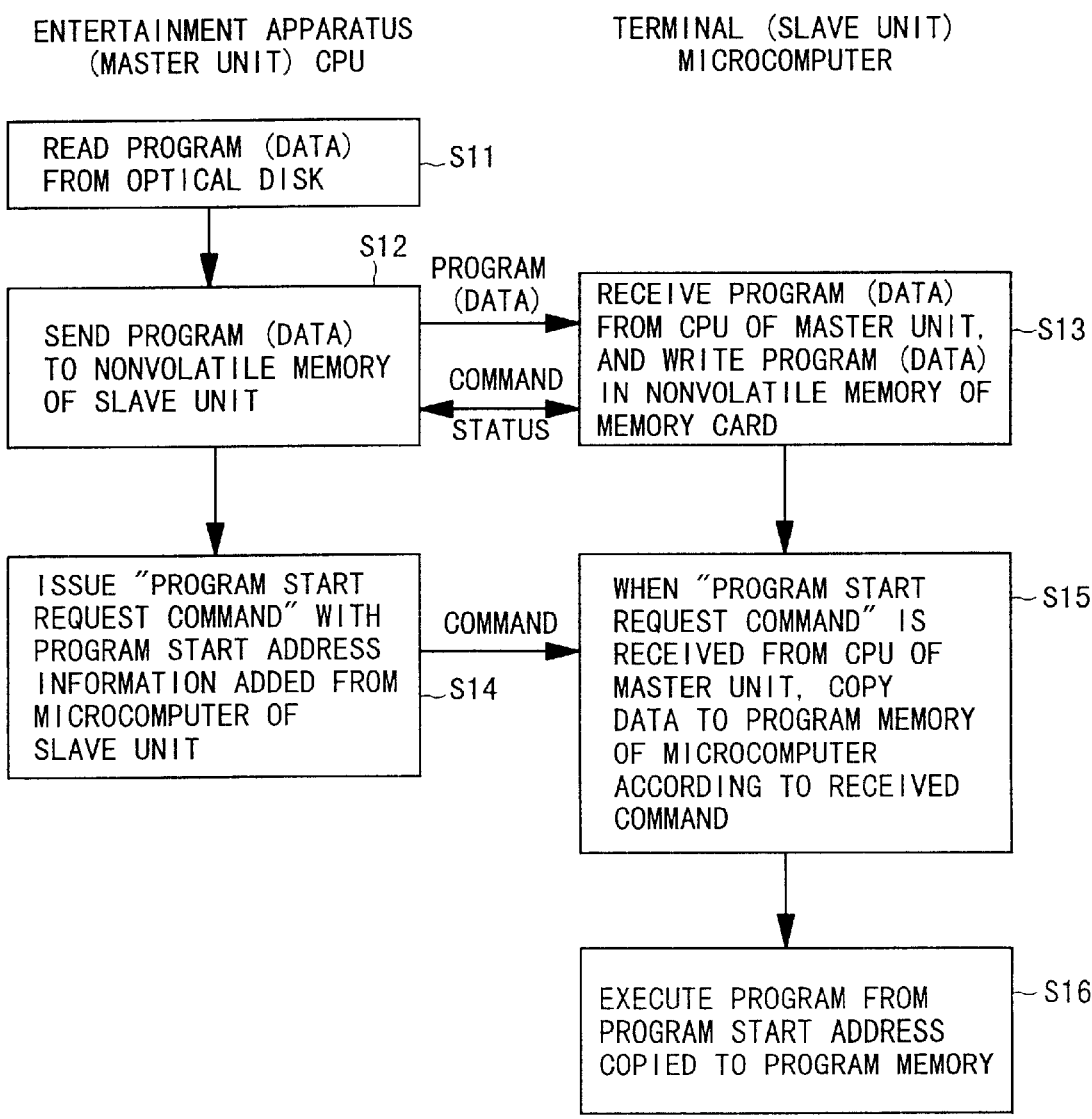
FIG. 16 is a flowchart of a sequence of downloading the program data shown in FIG. 15.

FIG. 15 shows such a flow of program data, and FIG. 16 shows a sequence of downloading the program data shown in FIG. 15.

As shown in FIG. 15, an application program of a video game which is supplied from the CD-ROM loaded in the disk loading unit 3 of the entertainment apparatus 1 is transferred (downloaded) via the CPU 51 of the entertainment apparatus 1 to the nonvolatile memory 164 in the terminal 100, thereafter copied to the program memory 160a in the microcomputer 160, and then executed.

In step S11 shown in FIG. 16, an application program of a video game which is to be run by the microcomputer 160 in the terminal 100 is read as data from the CD-ROM loaded in the disk loading unit 3 of the entertainment apparatus 1.

In step S12, the CPU 51 transfers (downloads) the program data read from the CD-ROM to the nonvolatile memory 164 in the terminal 100. This process is the same as when data are backed up in a conventional entertainment apparatus.

In step S13, the microcomputer 160 receives the program transferred from the CPU 51 as data, and stores the received program data in the nonvolatile memory 164, in the same manner as with the conventional data backup process.

In step S14, the entertainment apparatus 1 issues a "program start request command" with an address added where the downloaded program is to start.

In step S15, when the microcomputer 160 receives the "program start request command" from the CPU 51, the microcomputer 160 copies data of an indicated size to the program memory 160a from the address indicated by the above command in the nonvolatile memory 164.

In step S16, the microcomputer 160 executes the program copied to the program memory 160a from its starting address.

According to the above process, the program of the application software is transferred (downloaded) from the entertainment apparatus 1 via the nonvolatile memory 164 to the program memory 160a in the microcomputer 160 of the terminal 100.

Generally, the application program downloaded from the entertainment apparatus 1 to the terminal 100 is different from an application program that is run by the entertainment apparatus 1. However, the downloaded application program may be run on both the entertainment apparatus 1 and the terminal 100. In such a case, the CPU of the entertainment apparatus 1 and the microcomputer of the terminal 100 need to comprise identical processors.

A characteristic function of the terminal 100 according to the embodiment of the present invention will be described below with reference to FIGS. 17 through 19.

The characteristic function of the terminal 100 is to add information supplied from another terminal via the wireless communication means 172 to the information which has already been held by the terminal 100, and to sort all items of information depending on values thereof.

Figure 17:
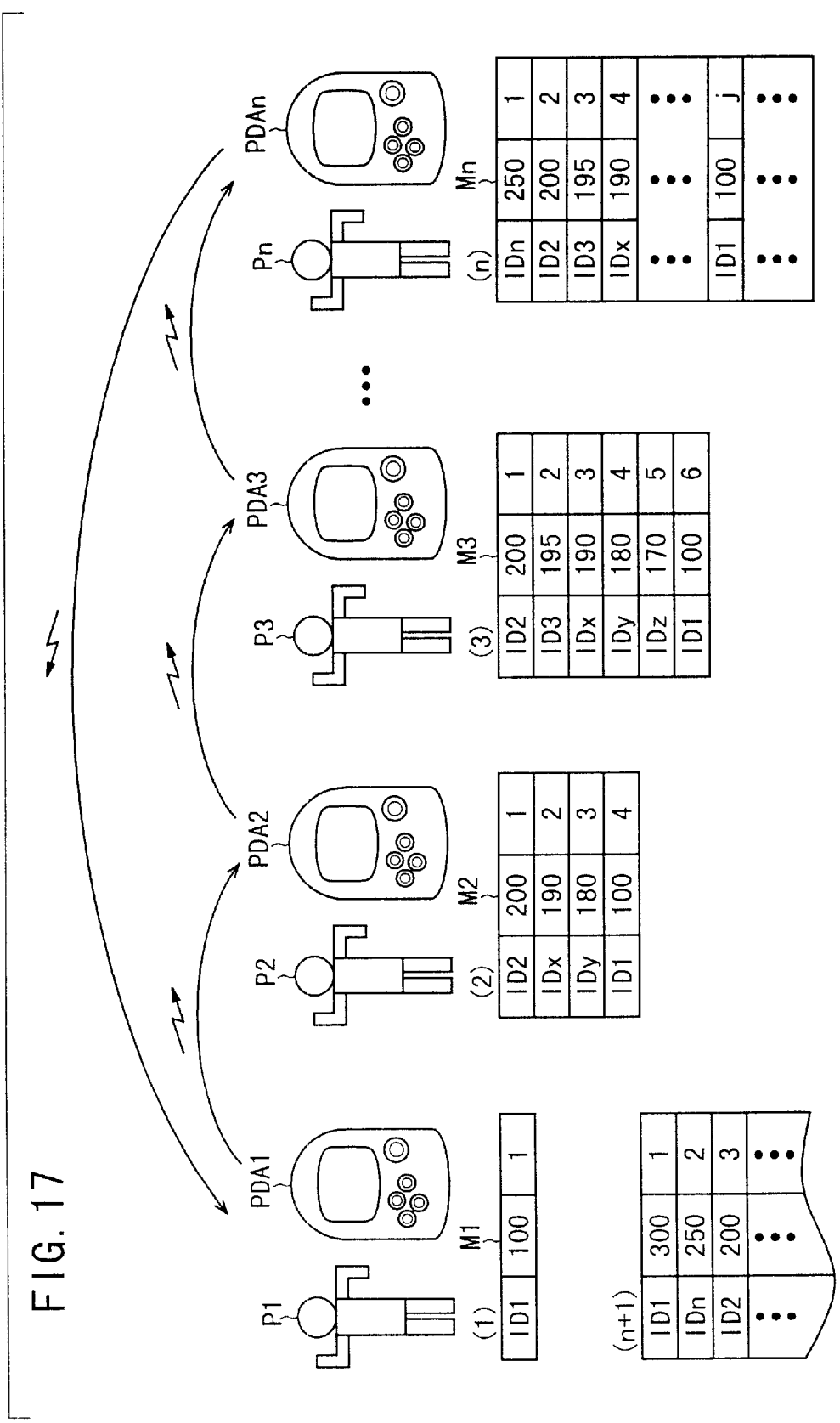
FIG. 17 is a diagram illustrative of the concept of an accumulation and sorting of generated score data of a plurality of portable information terminals when a game is played among the portable information terminals.

FIG. 17 is illustrative of the manner in which score data of a plurality of terminals PDA1, PDA2, PDA3, . . . PDAn, generated as a result of a game played among them are accumulated and sorted.

In FIG. 17, a master unit transmits score data generated as a result of a game played by the master unit to the terminals PDA1, PDA2, PDA3, . . . PDAn. The terminals PDA1, PDA2, PDA3, . . . PDAn assign respective identification numbers to the transmitted score data, and also assign respective ranking data to the score data. For example, in an initial state, since there is only one item of information in each of the terminals, the ranking data have a value of "1". The score data, the identification number data, and the ranking data are referred to as "result information".

When result information is transmitted from a terminal to another terminal, the destination terminal adds the transmitted result information to the result information which has already been held by the destination terminal. Thereafter, the terminal is sorted in the order of scores, and the ranking data are updated. Of the updated result information, the result information having the same identification number as the identification number of the terminal which is held by the user is displayed on the display means (LCD) 170 of the terminal.

A display format may be selected to display, within a displayable range of the display means (LCD) 170, the result information having the identification number of the terminal at the center and a plurality of items of result information above and below the result information at the center, or only the result information having the identification number of the terminal, or a plurality of items (including past ones) of the result information having the identification number of the terminal.

Therefore, the holder of the terminal can recognize the rank of its achievement among the achievements of the holders of other terminals.

A specific example of the above function will be described in detail below with reference to FIG. 17.

As shown in FIG. 17 at (1), result information held by the terminal PDA1 of a player P1 is transmitted to the terminal PDA2 of a player P2. The result information comprises a terminal ID "ID1", a score "100", and ranking data "1". The ranking data is "1" because there is only one item of result information in a memory M1 of the terminal PDA1.

As shown in FIG. 17 at (2), the terminal PDA2 of the player P2 determines whether the result information from the player P1 contains result information of the player P2 or not. It is assumed that a memory M2 of the terminal PDA2 stores score data of identification numbers ID2, IDx, IDy.

In the example, the result information from the player P1 does not contain result information of the player P2. The result information transmitted from the player P1 is added to the result information stored in the memory M2 of the terminal PDA2, and the stored items of result information are sorted and the ranks are updated.

Specifically, the identification number ID1 of the result information of the player P1 has score data "100", and the identification numbers ID2, IDx, IDy of the result information stored in the memory M2 of the terminal PDA2 have respective score data "200", "190", and "180".

Therefore, after the result information is sorted, the rank of the result information of the player P1 stored in the memory M2 is "4" as shown in FIG. 17 at (2).

Then, as shown in FIG. 17 at (3), the terminal PDA3 of a player P3 determines whether the result information from the player P2 contains result information of the player P3 or not. It is assumed that a memory M3 of the terminal PDA3 stores score data of identification numbers ID3, IDz.

In the example, the result information from the player P2 does not contain result information of the player P3. The result information transmitted from the player P2 is added to the result information stored in the memory M3 of the terminal PDA3, and the stored items of result information are sorted and the ranks are updated.

Specifically, the identification numbers ID2, IDx, IDy, ID1 of the result information stored in the memory M2 of the terminal PDA2 have respective score data "200", "190", "180", and "100", and the identification numbers ID3, IDz of the result information stored in the memory M3 of the terminal PDA3 have respective score data "195", "170".

Therefore, after the result information is sorted, the rank of the result information of the player P1 stored in the memory M3 is "6" as shown in FIG. 17 at (3).

As shown in FIG. 17 at (n+1), when result information stored in a memory Mn of the terminal PDAn of an nth player Pn is transmitted to the terminal PDA1 of the player P1, the terminal PDA1 determines whether the result information from the player Pn contains result information of the player P1 or not.

In the example, the result information from the player Pn contains result information of the player P1. Therefore, of the result information of the terminal PDA1 transmitted from the terminal PDAn, a portion which corresponds to the result information stored in the memory M1 of the terminal PDA1 at present is rewritten with the result information at present, and the stored items of result information are sorted and the ranks are updated.

For example, it is assumed that prior to the transmission from the terminal PDAn, the player P1 has gained a score "300", for example, higher than the first score "100". When the result information is transmitted from the terminal PDAn to the terminal PDA1, the transmitted result information is added in the terminal PDA1, and the result information corresponding to the terminal PDA1 is rewritten with the result information stored by the terminal PDA1 at present.

Thus, of the result information transmitted from the terminal PDAn, the score data "100" which corresponds to the identification number ID1 and which is stored by the terminal PDA1 is updated into the score "300" that is stored by the terminal PDA1 at present.

As described above, the result information of the terminal PDA1 transmitted from the terminal PDAn will not be stored in the memory M1 of the terminal PDA1 when transmitted again to the terminal PDA1 because at the time it is transmitted, the score data of the result information stored in the memory M1 is "300", which is greater than the score data "100" of the old result information of the terminal PDA1 which is transmitted. Stated otherwise, if there are a plurality of items of result information having the same identification number after the result information has been received, only the result information having the greatest score data remains stored.

The software (the result information processing means 200) for performing the above function will be described below with reference to FIGS. 18 and 19.

Figure 18:
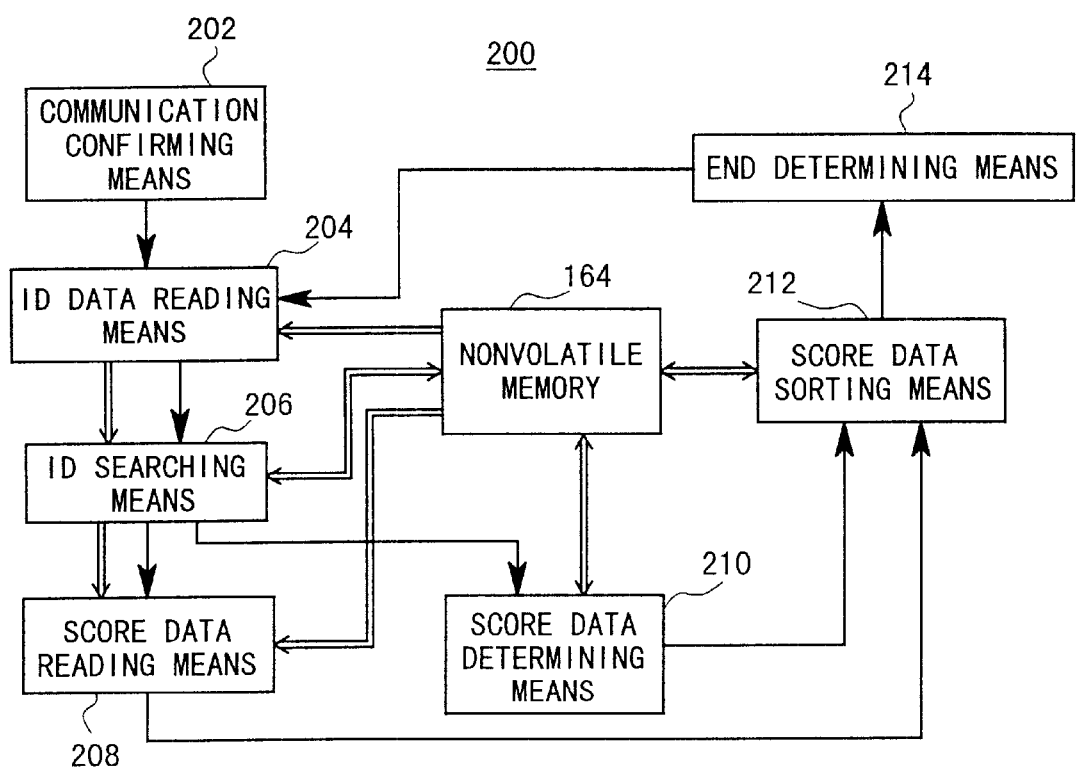
FIG. 18 is a functional block diagram of a result information processing means.

As shown in FIG. 18, the result information processing means 200 comprises a communication confirming means 202 for checking communications with another terminal and confirming the completion of a reception of result information, an ID data reading means 204 for reading ID data from the received result information, an ID searching means 206 for determining whether the read ID data is present in result information stored in the nonvolatile memory 164 or not, a score data reading means 208 for reading score data corresponding to the ID data from received data if the ID data is not present, a score data determining means 210 for selecting score data of a highest value of the score data corresponding to the ID data if the read ID data is present, a score data sorting means 212 for sorting the score data in the order of scores, and an end determining means 214 for determining whether the processing on the received result information or not.

A processing sequence of the result information processing means 200 will be described below with reference to FIG. 19.

Figure 19:
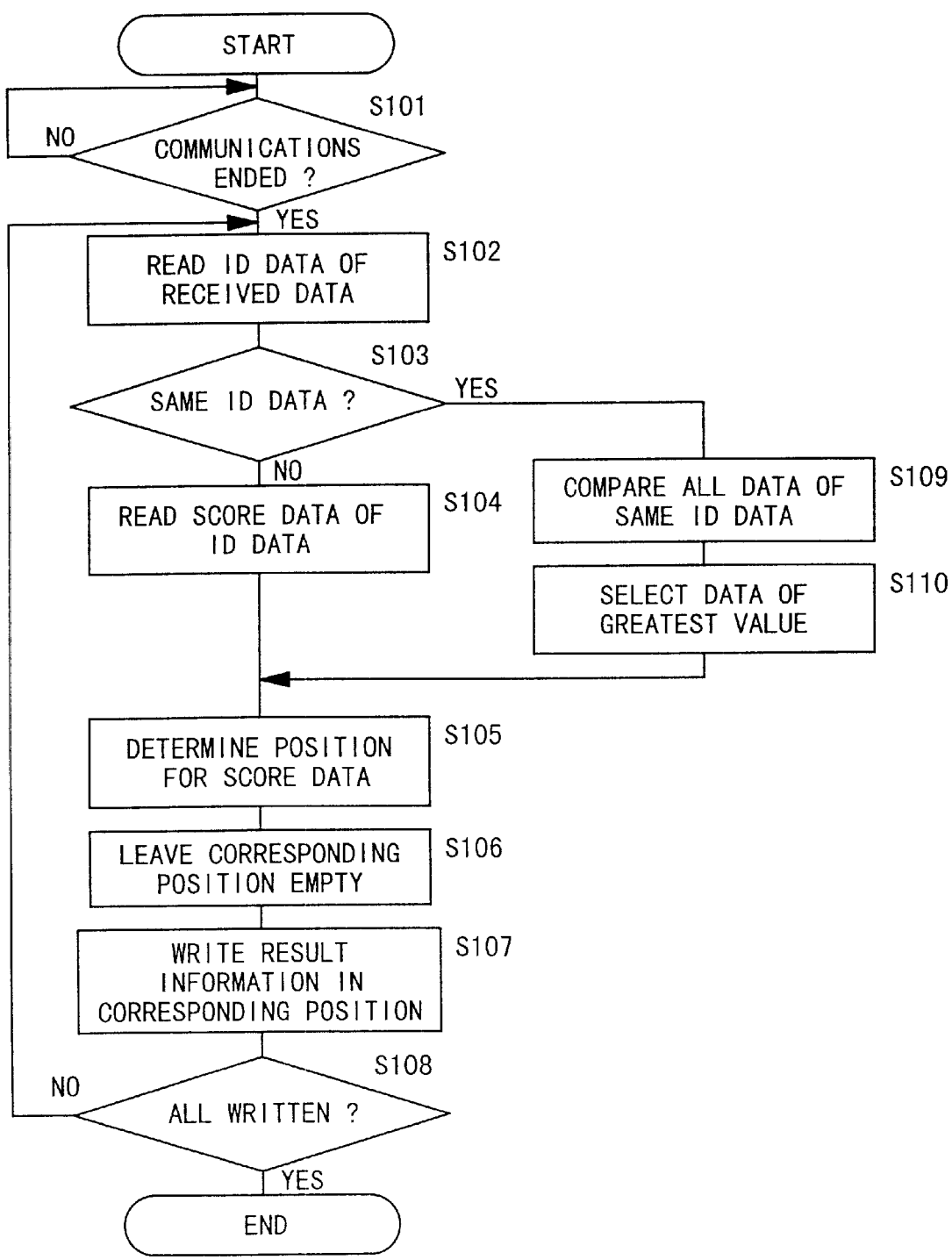
FIG. 19 is a flowchart of a processing sequence of the result information processing means shown in FIG. 18.

The processing sequence shown in FIG. 19 is executed by a program and data downloaded into the terminal 100 from a recording medium such as a CD-ROM, a DVD, or the like loaded in an information processing apparatus as a master unit, such as the entertainment system 500.

In step S101, the control means 160 enables the communication confirming means 202 to check communications with another terminal 100 and confirms the end of a reception of result information.

When the end of a reception of result information is confirmed, control goes to step S102 in which the control means 160 enables the ID data reading means 204 to read ID data from the received data stored in the nonvolatile memory 164, for example.

In step S103, the control means 160 enables the ID searching means 206 to determine whether result information containing the same ID data as the read ID data is present in the result information which has already been stored in the nonvolatile memory 164 prior to the reception.

If no result information containing the same ID data as the read ID data is present, then control proceeds to step S104 in which the control means 160 enables the score data reading means 208 to read score data corresponding to the ID data from the received result information.

In step S105, the control means 160 enables the score data sorting means 212 to compare the value of the read score data with the value of the score data of the result information which has already been stored in the nonvolatile memory 164 in order to determine a position where the read score data is to be written.

Specifically, the score data sorting means 212 determines a position between the result information having the score data whose value is closest to and greater than the value of the read score data and the result information having the score data whose value is closest to and smaller than the value of the read score data.

In step S106, the control means 160 enables the score data sorting means 212 to shift all the result information one notch and register it again, which is lower in ranking than the result information having the score data whose value is closest to and smaller than the value of the read score data, in order to register the result information (received data) having the store data in the determined position.

The control means 160 enables the score data sorting means 212 to update the ranking. As described above with reference to FIG. 17, if the score data of certain received data is "200" and the score data of the two items of result information stored in the memory are "150", "100", respectively, and their ranks are "1", "2", respectively, then the received data is registered as result information in the memory, and the ranks of the result information having the score data "200", "150", "100" in the memory are "1", "2", "3", respectively.

In step S107, the control means 160 enables the score data sorting means 212 to register the result information having the score data in an empty position, i.e., the position in which there is registered the result information having the score data whose value is closest to and smaller than the value of the read score data.

As described above, the result information having the score data whose value is closest to and smaller than the value of the read score data has already been registered again one notch below in step S106, and will not be deleted.

In step S108, the control means 160 enables the end determining means 214 to determine whether the received information has all been written in corresponding positions or not.

If the processing on all the received result information has not been ended, then control returns to step S102 to register next result information in a corresponding position. If the processing on all the received result information has been ended, then the processing sequence of the result information processing means 200 is brought to an end.

If result information containing the same ID data as the read ID data is present in step S103, then control proceeds to step S109 in which the control means 160 enables the score data determining means 210 to compare the score data corresponding to the ID data and the score data of all the result information containing the same ID data as the ID data of the received data.

In step S110, the control means 160 enables the score data determining means 210 to select the result information having the score data whose value is greatest. The other result information which has been compared is deleted.

Subsequently, control goes to step S105 to perform the processing described above.

The present invention offers the following advantages:

1. When score data as a result of a game or the like performed by the master unit is transmitted to the terminal 100, the terminal 100 adds an inherent ID to the score data and stores them as result information. When result information is transmitted from another terminal 100, the transmitted result information is received and registered. The items of the received information are sorted and updated in ranking. Therefore, a new ranking system can be provided which enables the user of the terminal 100 to easily recognize the rank of the achievement of the user among other users of terminals.

2. When the past result information of the user of the terminal 100 is transmitted back from another terminal, the score data of the transmitted past result information and the score data of the result information presently stored in the terminal 100 of the user are compared with each other, and only the result information having the score data whose value is higher remains stored.

In the illustrated embodiment, result information represent scores, and items of result information are ranked in the order of scores. However, result information may represent times, numbers, or the like. If result information represents a time, then it may indicate a period of time (e.g., a hour) consumed until a game or stage is ended or cleared. The rank is higher as the time is shorter.

If result information represents a number, then it may indicate the number of stages which have been cleared until the game is over. The rank is higher as the number is greater.

In the illustrated embodiment, the result is transmitted from the master unit to the terminal. However, the result may be transmitted from the terminal 100. While program data has been illustrated as being downloaded from the master unit to the terminal 100, the terminal may be a stand-alone type terminal where program data is initially loaded therein.

Although a certain preferred embodiment of the present invention has been shown and described in detail, it should be understood that various changes and modifications may be made therein without departing from the scope of the appended claims.

What is claimed is:

1. A portable information terminal comprising:
   a memory for storing a program and data;
   a manual controller for entering manual control inputs;
   a processing unit for executing said program and generating at least images based on manual control inputs entered by said manual controller to control progression of said program;
   a display for displaying the images generated by said processing unit; and
   a data communication unit for transmitting information relative to said program between said portable information terminal and another portable information terminal,
   wherein said processing unit adds information supplied from the other portable information terminal via said data communication unit to information already stored in said memory for producing accumulated information, and sorts the accumulated information according to values thereof,
   and wherein said display displays score information of information terminals including score information of said portable information terminal based on the sorted information.

2. A portable information terminal according to claim 1, wherein said terminal unit has inherent identification information, said information comprising result information processed and generated by an information processing apparatus as a master unit for the terminal unit and transmitted to said terminal unit, said information being assigned an identification number of the terminal unit after being transmitted thereto.

3. A portable information terminal according to claim 1, wherein said terminal unit has inherent identification information, said control means comprising means for keeping at least one representative item of information of all the information having the same identification number when all the information is sorted.

4. A portable information terminal according to claim 1, wherein said program is downloaded from an information processing apparatus as a master unit for the terminal unit.

5. A portable information terminal according to claim 1, wherein said information represents a score, a time, or number generated as a result of the execution of said program.

6. A portable information terminal according to claim 1, wherein said information processing means comprises:
   information reading means for, if there is information which is not held by said terminal unit in the received information, reading said information;
   information determining means for, if there is information which is held by said terminal unit in the received information, selecting information related to said information and satisfying a predetermined condition; and
   sorting means for sorting the read information and the selected information according to a predetermined rule.

7. A portable information terminal according to claim 1, wherein said information processing means comprises:
   identification information reading means for reading identification information of the received information;
   identification information searching means for determining whether the read identification information is present in information which is held by said terminal unit;
   information reading means for, if the read identification information is not present in information which is held by said terminal unit, reading information corresponding to the identification information from the received information;
   information determining means for, if the read identification information is present in information which is held by said terminal unit, selecting information related to all information corresponding to said identification information and satisfying a predetermined condition; and
   sorting means for sorting the read information and the selected information according to a predetermined rule.

8. A portable information terminal comprising:
   a memory for storing a program and data;
   a manual controller for entering manual control inputs;
   a processing unit for executing said program and generating at least images based on manual control inputs entered by said manual controller to control progression of said program;
   a display for displaying the images generated by said processing unit; and
   a data communication unit for transmitting information relative to said program between said portable information terminal and another portable information terminal,
   wherein said processing unit adds information supplied from the other portable information terminal via said data communication unit to information already stored in said memory for producing accumulated information, and sorts the accumulated information according to values thereof, and wherein said processing unit confirms identification data of said portable information terminal supplied from the other portable information terminal, and said display displays the identification data.

9. A portable information terminal according to claim 8, wherein said terminal unit has inherent identification information, said information comprising result information processed and generated by an information processing apparatus as a master unit for the terminal unit and transmitted to said terminal unit, said information being assigned an identification number of the terminal unit after being transmitted thereto.

10. A portable information terminal according to claim 8, wherein said terminal unit has inherent identification information, said control means comprising means for keeping at least one representative item of information of all the information having the same identification number when all the information is sorted.

11. A portable information terminal according to claim 8, wherein said program is downloaded from an information processing apparatus as a master unit for the terminal unit.

12. A portable information terminal according to claim 8, wherein said information represents a score, a time, or number generated as a result of the execution of said program.

13. A portable information terminal according to claim 8, wherein said information processing means comprises:

information reading means for, if there is information which is not held by said terminal unit in the received information, reading said information;

information determining means for, if there is information which is held by said terminal unit in the received information, selecting information related to said information and satisfying a predetermined condition; and sorting means for sorting the read information and the selected information according to a predetermined rule.

14. A portable information terminal according to claim 8, wherein said information processing means comprises:

identification information reading means for reading identification information of the received information;

identification information searching means for determining whether the read identification information is present in information which is held by said terminal unit;

information reading means for, if the read identification information is not present in information which is held by said terminal unit, reading information corresponding to the identification information from the received information;

information determining means for, if the read identification information is present in information which is held by said terminal unit, selecting information related to all information corresponding to said identification information and satisfying a predetermined condition; and sorting means for sorting the read information and the selected information according to a predetermined rule.

15. A method of storing data in a portable information terminal, comprising:

storing a program and data in a memory;

receiving manual control inputs through a manual controller;

executing said program using a processing unit and generating at least images based on manual control inputs entered by said manual controller to control progression of said program;

displaying the images generated by said processing unit using a display;

transmitting information relative to said program between said portable information terminal and another portable information terminal using a data communication unit;

adding information supplied from the other portable information terminal via said data communication unit to information already stored in said memory for producing accumulated information using said processing unit;

sorting the accumulated information according to values thereof using said processing unit;

displaying score information of information terminals including score information of said portable information terminal based on the sorted information using said display.

16. A method according to claim 15, wherein said portable information terminal has inherent identification information, said information comprising result information processed and generated by an information processing apparatus as a master unit for the terminal unit and transmitted to said terminal unit, said information being assigned an identification number of the terminal unit after being transmitted thereto.

17. A method according to claim 15, wherein said portable information terminal unit has inherent identification information, and said control means keeps at least one representative item of information of all the information having the same identification number when all the information is sorted.

18. A method according to claim 15, wherein said program is downloaded from an information processing apparatus as a master unit for the terminal unit.

19. A method according to claim 15, wherein said information represents a score, a time, or number generated as a result of the execution of said program.

20. A method according to claim 15, further comprising:

if there is information which is not held by said terminal unit in the received information reading said information;

if there is information which is held by said terminal unit in the received information, selecting information related to said information and satisfying a predetermined condition; and sorting the read information and the selected information according to a predetermined rule.

21. A method according to claim 15, further comprising:

reading identification information of the received information;

determining whether the read identification information is present in information which is held by said terminal unit;

if the read identification information is not present in information which is held by said terminal unit, reading information corresponding to the identification information from the received information;

if the read identification information is present in information which is held by said terminal unit, selecting information related to all information corresponding to said identification information and satisfying a predetermined condition; and sorting the read information and the selected information according to a predetermined rule.

22. A method of storing data in a portable information terminal, comprising:

storing a program and data in a memory;

receiving manual control inputs through a manual controller;

executing said program using a processing unit and generating at least images based on manual control inputs entered by said manual controller to control progression of said program;

displaying the images generated by said processing unit using a display;

transmitting information relative to said program between said portable information terminal and another portable information terminal using a data communication unit;

adding information supplied from the other portable information terminal via said data communication unit to information already stored in said memory for producing accumulated information using said processing unit;

sorting the accumulated information according to values thereof using said processing unit;

confirming identification data of said portable information terminal supplied from the other portable information terminal using said processing unit; and displaying the identification data using said display.

23. A method according to claim 22, wherein said portable information terminal has inherent identification information, said information comprising result information processed and generated by an information processing apparatus as a master unit for the terminal unit and transmitted to said terminal unit, said information being assigned an identification number of the terminal unit after being transmitted thereto.

24. A method according to claim 22, wherein said portable information terminal unit has inherent identification information, and said control means keeps at least one representative item of information of all the information having the same identification number when all the information is sorted.

25. A method according to claim 22, wherein said program is downloaded from an information processing apparatus as a master unit for the terminal unit.

26. A method according to claim 22, wherein said information represents a score, a time, or number generated as a result of the execution of said program.

27. A method according to claim 22, further comprising:

if there is information which is not held by said terminal unit in the received information reading said information;

if there is information which is held by said terminal unit in the received information, selecting information related to said information and satisfying a predetermined condition; and sorting the read information and the selected information according to a predetermined rule.

28. A method according to claim 22, further comprising:

reading identification information of the received information;

determining whether the read identification information is present in information which is held by said terminal unit;

if the read identification information is not present in information which is held by said terminal unit, reading information corresponding to the identification information from the received information;

if the read identification information is present in information which is held by said terminal unit, selecting information related to all information corresponding to said identification information and satisfying a predetermined condition; and sorting the read information and the selected information according to a predetermined rule.

* * * * *